United States Patent
Alvarez et al.

(10) Patent No.: US 12,325,453 B2
(45) Date of Patent: Jun. 10, 2025

(54) HANDOVER ASSISTANT FOR MACHINE TO DRIVER TRANSITIONS

(71) Applicant: Intel Corporation, Santa Clara, CA (US)

(72) Inventors: Ignacio J. Alvarez, Portland, OR (US); Michael Paulitsch, Ottobrunn (DE); Rafael Rosales, Unterhaching (DE); Cornelius Buerkle, Karlsruhe (DE); Florian Geissler, Munich (DE); Fabian Oboril, Karlsruhe (DE); Frederik Pasch, Karlsruhe (DE); Yang Peng, Munich (DE)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 17/408,521

(22) Filed: Aug. 23, 2021

(65) Prior Publication Data
US 2021/0380143 A1    Dec. 9, 2021

(51) Int. Cl.
*B60W 60/00* (2020.01)
*B60W 40/02* (2006.01)
(Continued)

(52) U.S. Cl.
CPC ........ *B60W 60/0053* (2020.02); *B60W 40/02* (2013.01); *B60W 40/08* (2013.01);
(Continued)

(58) Field of Classification Search
CPC ........ B60K 35/00; B60K 35/28; B60K 35/29; B60K 2360/172; B60K 2360/175;
(Continued)

(56) References Cited

U.S. PATENT DOCUMENTS 11,772,670 B2 * 10/2023 Bielby ............... B60W 50/12
701/70
2007/0255498 A1 * 11/2007 McDaniel ........... G01S 13/931
340/436

(Continued)

FOREIGN PATENT DOCUMENTS

DE    102020120663 A1    4/2021
EP    3428026 A1    1/2019
(Continued)

OTHER PUBLICATIONS

Diba, Ali et al., "Temporal 3d ConvNets: New architecture and transfer learning for video classification", Nov. 22, 2017, 9 pages, arXiv.

(Continued)

*Primary Examiner* — Peter D Nolan
*Assistant Examiner* — Ce Li Li
(74) *Attorney, Agent, or Firm* — Viering, Jentschura & Partner mbB

(57) ABSTRACT

Disclosed herein is a vehicle handover system that monitors an environment of a vehicle. The vehicle handover system receives a transition request to change control of the vehicle from an automated driving mode to a passenger of the vehicle. The vehicle handover system detects a key event that may be relevant to the transition request and the detection of the key event is based on the monitored environment. The vehicle handover system may generate a handover scene that includes images associated with the key event, and the images include an image sequence over a time-period of the key event. Before the vehicle handover system changes control of the vehicle from the automated driving mode to the passenger, the handover scene is displayed to the passenger.

19 Claims, 6 Drawing Sheets

(51) Int. Cl.
*B60W 40/08* (2012.01)
*B60W 50/14* (2020.01)

(52) U.S. Cl.
CPC ....... *B60W 50/14* (2013.01); *B60W 2050/146* (2013.01); *B60W 2420/403* (2013.01); *B60W 2540/229* (2020.02)

(58) Field of Classification Search
CPC ........ B60K 2360/1868; B60W 30/182; B60W 40/02; B60W 40/08; B60W 50/14; B60W 60/0053; B60W 2050/0075; B60W 2050/0095; B60W 2050/146; B60W 2420/403; B60W 2420/408; B60W 2420/54; B60W 2540/225; B60W 2540/229; B60W 2554/00; B60W 2554/4046; B60W 2556/10; B60W 2556/45; G06F 16/739; G06F 16/7867
See application file for complete search history.

(56) References Cited

U.S. PATENT DOCUMENTS

| | | | | |
|---|---|---|---|---|
| 2011/0106442 | A1* | 5/2011 | Desai | G08G 1/161 |
| | | | | 701/532 |
| 2016/0055750 | A1* | 2/2016 | Linder | G08G 1/16 |
| | | | | 340/905 |
| 2018/0203455 | A1* | 7/2018 | Cronin | G01C 21/3461 |
| 2018/0222492 | A1* | 8/2018 | Takii | F21S 41/16 |
| 2019/0111943 | A1* | 4/2019 | Suzuki | B60W 60/0055 |
| 2019/0299996 | A1* | 10/2019 | Stübing | B60W 30/16 |
| 2019/0351916 | A1* | 11/2019 | Mangal | B60K 35/00 |
| 2019/0381965 | A1* | 12/2019 | McCool | B60R 21/01512 |
| 2020/0207301 | A1* | 7/2020 | Lombrozo | B60R 21/34 |
| 2020/0339157 | A1 | 10/2020 | Alvarez et al. | |
| 2020/0379460 | A1* | 12/2020 | Stent | G06V 10/82 |
| 2021/0188289 | A1* | 6/2021 | Oba | G08G 1/00 |
| 2021/0221404 | A1* | 7/2021 | Reiner | G05D 1/0055 |
| 2022/0081009 | A1 | 3/2022 | Oba et al. | |
| 2024/0027760 | A1* | 1/2024 | Beckman | G02B 27/0101 |

FOREIGN PATENT DOCUMENTS

| | | |
|---|---|---|
| EP | 3575174 A1 | 12/2019 |
| WO | 2020145161 A1 | 7/2020 |

OTHER PUBLICATIONS

Wang, X. et al., "I3d-ISTM: A New Model for Human Action Recognition", retrieved on Aug. 18, 2021, 7 pages, IOP Conference Series: Materials Science Engineering.
Bredereke, Jan et al.; "A Rigorous View of Mode Confusion"; http://www.informatik.uni-bremen.de/kogrob/papers/safecomp02.pdf; Proceedings of SafeComp 2002; retrieved on Aug. 18, 2021; 12 pages; Springer Verlag.
McCall, Rod et al., "A taxonomy of autonomous vehicle handover situations", Transportation Research Part A: Policy and Practice, Jun. 2019, pp. 507-522, Elsevier, vol. 124.
Matthews, M. L. et al., "Model for situation awareness and driving: application to analysis and research for intelligent transportation systems", Transportation Research Record Journal of the Transportation Research Board 1779, Jan. 2001, pp. 26-32, vol. 1.
Endsley, M.R., "Situation awareness global assessment technique(SAGAT)", IEEE, Proceedings of the IEEE 1988 National Aerospace and Electronics Conference, May 23-27, 1988, pp. 789-795, Dayton, Ohio, USA.
Extended European search report issued for corresponding European patent application No. EP22182188.7, dated Nov. 30, 2022, 8 pages (for informational purposes only).

* cited by examiner

HANDOVER ASSISTANT FOR MACHINE TO DRIVER TRANSITIONS

TECHNICAL FIELD

The disclosure relates generally to automated driving systems, and in particular, to driving systems that may transfer control of a vehicle from an automatic driving mode to a human driver.

BACKGROUND

Vehicles with autonomous or partially autonomous driving modes are becoming more popular. Such vehicles typically include a variety of monitoring systems that are equipped with a variety of cameras and other sensors to observe information about the interior of the vehicle, monitor the motion of the vehicle, and scan for objects outside the vehicle. When a vehicle is operating in an autonomous (or partially autonomous) driving mode, it may become necessary to return control (or partial control) of the vehicle back to a human driver.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
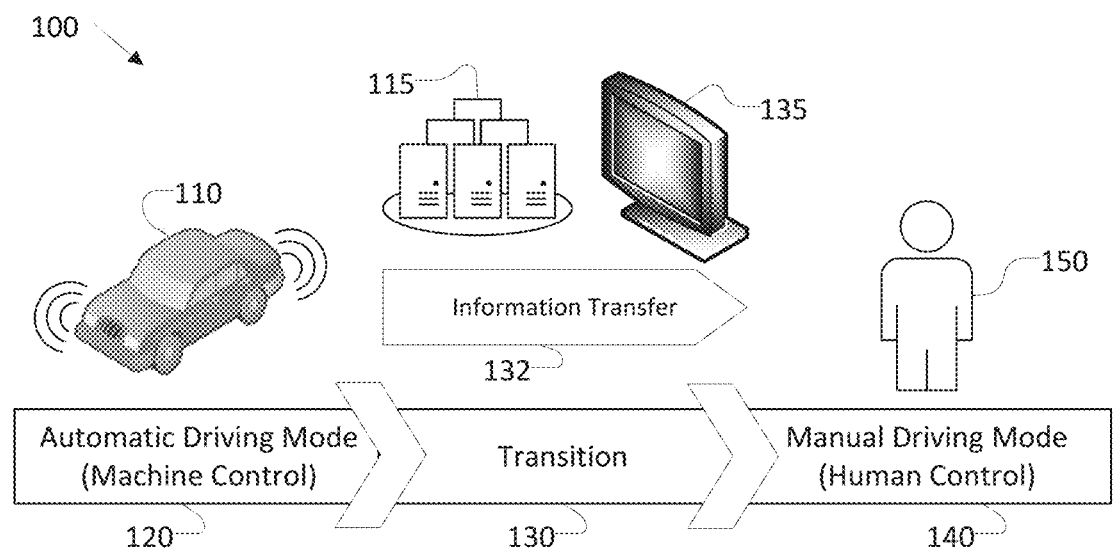
FIG. 1 illustrates an example flowchart of a vehicle handover system for a vehicle that may transition from an automatic driving mode to a manual driving mode.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, or a rocket, among others.

A "passenger" may be understood to include any person within a vehicle. By way of example, a passenger may be seated in what may be understood as the driver's seat (e.g., behind a steering wheel) or the passenger's seat (e.g., not behind the steering wheel). A passenger may be understood to be the "driver" of the vehicle, regardless as to whether the driver is actively controlling the vehicle (e.g., the vehicle may be controlled by an autonomous driving mode or a partially autonomous driving mode) or simply allowing the autonomous mode to control the vehicle.

The apparatuses and methods described herein may be implemented using a hierarchical architecture, e.g., by introducing a hierarchical prioritization of usage for different types of users (e.g., low/medium/high priority, etc.), based on a prioritized access to the spectrum (e.g., with highest priority given to tier-1 users, followed by tier-2, then tier-3, etc.).

Vehicles that include autonomous or partially autonomous driving modes are usually equipped with monitoring systems that are typically related to safety systems for controlling the autonomous driving mode or warning a driver about objects that may appear in the vehicle's vicinity. The monitoring systems typically include a variety of inputs, sensors, cameras, and other information-gathering devices to assist the automatic driving mode to make movements, follow a particular route, avoid collisions, and generally operate the vehicle safely as the environment around the vehicle changes dynamically. When a vehicle is operating in a fully autonomous or partially autonomous driving mode, it may become necessary for the vehicle to handover control of the vehicle from the autonomous system back to a human driver. Current systems, however, do not adequately assess whether the human driver is prepared to assume control of the vehicle. As discussed in more detail below, the instant disclosure provides a system for monitoring, recording, and displaying recent events that may inform the human driver about the current situation of the vehicle at the time of the handover. The system may also assess the expected reaction time of the passenger to inform the handover process and/or inform other vehicle safety/monitoring systems of the passenger's expected reaction time. The system may also assess whether the driver is confused about how to properly react to the current situation of the vehicle or to safely operate the vehicle, and then the system may use this information in the handover process or to inform the vehicle's other safety/monitoring systems. As a result, the system provides relevant past events that may not have been perceived by the passenger about to receive control of the vehicle from the automated driving mode, thereby improving the safety of the handover. The safety may be further improved by customizing how the information is rendered and on what basis, in order to improve the knowledge transfer to the passenger before and during the handover.

FIG. 1 illustrates an example flowchart 100 of a vehicle handover system for a vehicle that transitions from an automatic driving mode to a manual driving mode. Reading flowchart 100 from left to right, the vehicle may be operating in an automatic driving mode 120. Automatic driving mode 120 may include fully automated or partially automated control of the vehicle, where an automated vehicle system, such as automated vehicle system 110, may control the vehicle to move along a route by monitoring various sensors and inputs that provide information about the vehicle and its surrounding environment. While in automatic driving mode 120, automated vehicle system 110 may sense, record, and track information about the environment around the vehicle, the movement of the vehicle, and the movement of objects proximate the vehicle. The automated vehicle system 110 of the vehicle may collect such environmental information using any number of sensors, including, as examples, cameras, light detection and ranging (LiDAR) sensors, vehicle position sensors, vehicle speed sensors, accelerometers, gyroscopes, etc.

Before the vehicle releases control from the automatic driving mode 120 to a driver in manual driving mode 140 (e.g., to human driver 150), there may be a transition period 130 where the system may transfer key event information (e.g., of an event that may impact the safety of the handover) to the human (e.g., in information transfer 132) so that the human driver is informed about the current situation of the vehicle and to facilitate a safe handover. Information transfer 132 may be designed to inform the driver of the current situation of the vehicle and of recent events that may be important for the driver to be aware of in order to safely assume control of the vehicle. The system may identify key event information associated with the current situation or recent events (e.g., key event information 115) and display this key event information (or a portion thereof) as text and/or images on a screen in the vehicle (e.g., on screen 135), verbalize/read the key event information to the driver through the vehicle's audio system, provide a text message or an alert on the driver's smartphone with the key event information, and/or inform the driver in any other manner of the key events that may be relevant to a safe transition.

Figure 2:
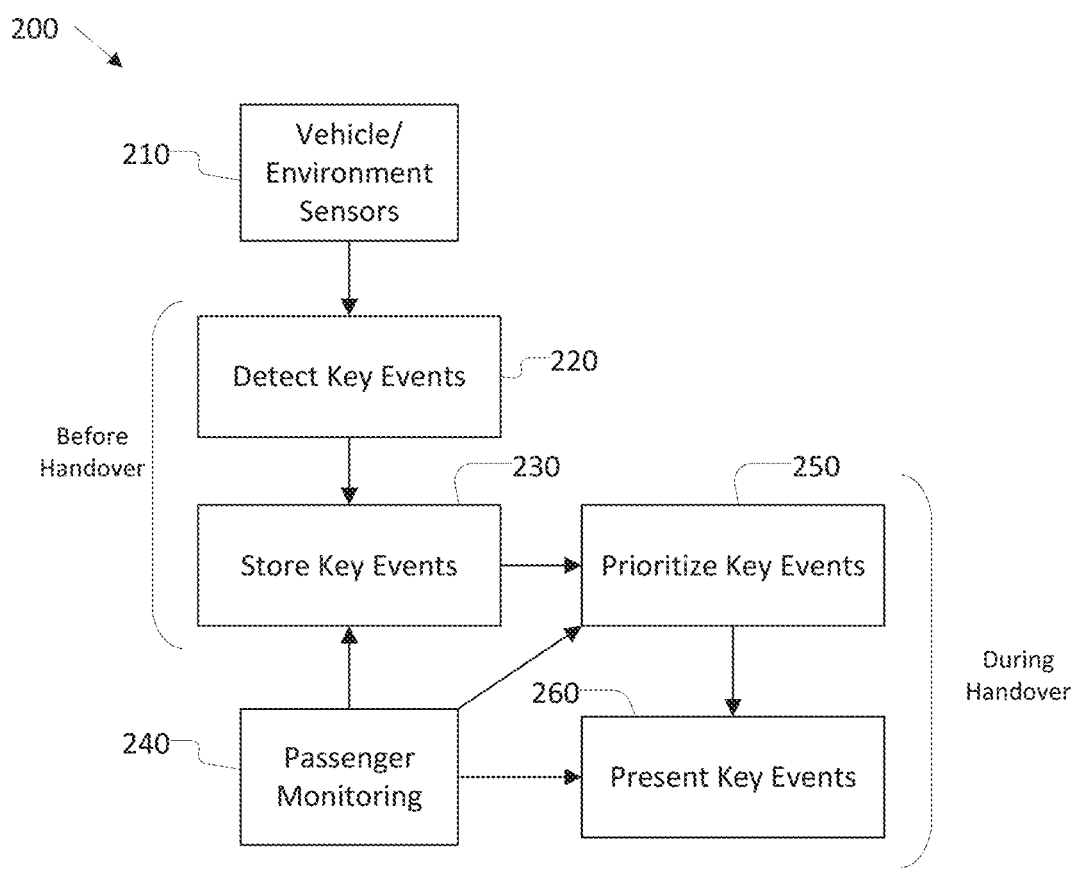
FIG. 2 shows an exemplary vehicle handover system that presents transition information to a human driver during a vehicle handover.

FIG. 2 illustrates an exemplary vehicle handover system 200 for presenting transition information to a human driver during a vehicle handover from an automatic driving mode to a manual driving mode. While in an automatic driving mode, the vehicle is constantly monitoring, in module 210, the motion of the vehicle and the surrounding environment in order to safely operate the vehicle. The vehicle/environment sensors may include any number of sensors and combinations of sensors/inputs, including, as examples, cameras, light detection and ranging (LiDAR) sensors, vehicle position sensors, vehicle speed sensors, accelerometers, gyroscopes, etc. The detect key events module 220 receives the sensor information from the vehicle/environment sensors module 210 and uses this information to determine whether the information may relate to a key event that may be relevant to a vehicle handover.

The key events detected by the detect key events module 220 may include movement events that, while for example in automatic driving mode, caused or may cause the vehicle to change its trajectory (e.g., a change in a previously planned trajectory), such as when the vehicle detects an unexpected object on the road (e.g., an object that falls from another vehicle in front of the ego vehicle) or when the vehicle detects a temporary road sign that is not mapped (e.g., a person waving a flag in a construction zone that signals a slower speed). The key events may also include unexpected behavior events associated with other objects or vehicles that are proximate to the ego vehicle and/or in the monitored environment of the vehicle. This might include, for example, vehicles that have violated traffic rules (e.g. a vehicle that ignored a red traffic light), or a vehicle whose trajectory does not follow the expected behavior/route (e.g., erratic movement along a straight road, unprovoked or irresponsible lane changes, etc.). The key events may also include an operating outside domain event where the vehicle detects conditions that indicate the vehicle is operating with a setpoint that is outside of the particular driving profile/domain for the safe operation of a vehicle in a particular geographic location and/or situation (e.g., detecting snow in a hill at night with no street illumination such that the current domain/profile may not longer be satisfied). The detect key events module 220 may detect key events using data-driven models (e.g. deep neural networks (DNNs)) to analyze the sensor data of the external environment to identify any events that may be relevant for handing over control of the vehicle to a human driver.

The detect key events module 220 may detect key events using a dedicated module associated with each category of key event described in the preceding paragraph. The detect key events module 220 may, for example, detect key events by analyzing sensor data that may be received from the vehicle/environment sensors module 210, such as video frames from an external camera used for object detection. The detect key events module 220 may coordinate other event detectors with the vehicle's pre-processing algorithms (e.g., the vehicle's vehicle tracking and trajectory analysis). In addition, the detect key events module 220 may use diagnostic or output signals from other vehicle modules to detect other types of events. The detect key events module 220 may buffer the sensor/signal information that is associated with the key event as a scene summary that includes (i) a processed environmental model in an specified point of view (ii) the original sensor/signal information received from the vehicle/environment sensors module 210 or other module, and/or (iii) a pre-assessment of the importance of the sensor/signal information to the transition. The detect key events module 220 may buffer scene summary information associated with key events for potential use in the store key events module 230, discussed below.

Once the detect key events module 220 has detected and buffered a key event and its associated information, it passes the information to the store key events module 220. The store key events module 220 may store each key event as an augmented image sequence, which may be a data structure that contains information about the key event over a time period, designed to communicate how the key event evolved over time. The augmented image sequence may include a number of different viewpoints, e.g., a front-facing vehicle camera view, a bird's eye view, a rear-view mirror view, a map view, etc. Each viewpoint may include any of the information associated with the key event and may be arranged in a different spatial perspective. The store key events module 220 may generate any number of spatial perspectives, each based on the information associated with the key event. In addition, the augmented image sequence may include metadata information associated with the key event, including for example, information that identifies when and where the event occurred, the kind of event, the duration of the event and/or augmented image sequence, an image viewpoint for each image, and/or a pre-assessed importance of each frame (if the detect key events module 220 provides it) that may enable selecting a subset of frames or emphasizing more important frames.

In addition, the store key events module 230 may make decisions about which events to store, which metadata should be stored with the event, and the time period for the stored event based on information received from the passenger monitoring module 240. The passenger monitoring module 240 may monitor attributes of the passenger and provide the information to the store key events module 230. As will be discussed in more detail later, the monitored attributes of the passenger, for example, may include the attention of the passenger, the location of the passenger in the vehicle, the estimated reaction time of the passenger, a mode confusion of the passenger, and/or any other attributes of the passenger that may impact which events, the type of information about the event, and the level of detail associated with the event that may need to be stored.

Next, the store key events module 230 may pass the stored information to the prioritize key events module 250. The prioritize key events module 250 may assess each of the key events to determine the importance of event to the transition by considering any number of variables. As one example, the prioritize key events module 250 may use time (e.g., compare the elapsed time since the key event) to rate recent events as more or less important (e.g., the older the event, the less important). As another example, the prioritize key events module 250 may identify a category for the event and highlight events that belong to a higher priority category (e.g., highly dynamic events, highly unsafe events) as a more important event. To accomplish this, the prioritize key events module 250 may use a fixed table of event class priorities to categorize the event as one of the event classes. As another example, the prioritize key events module 250 may use a spatial locality of the event (e.g., its proximity to the vehicle) to prioritize as more important those events that are closer to the ego vehicle or in the planned path of the ego vehicle.

As another example, the prioritize key events module 250 may base its prioritization on passenger attributes provided by the passenger monitory module 240. For example, the passenger monitory module 240 may provide passenger focus information about a passenger that relates to whether the driver is likely to have observed the key event, missed the key event, or observed only a portion of the key event. For example, if the driver was looking to the right side of the vehicle while the key event was occurring on the left side of the vehicle, the passenger monitoring module 240 may determine there is a low likelihood the driver is aware of the event. As another example, the passenger monitoring module 240 may determine that the driver was looking in the same direction as the key event but the driver's attention was mainly focused on a billboard advertisement. As such, the passenger monitoring module 240 may determine that the driver is likely to be aware of certain aspects of the key event but may not have all of the important information. This type of passenger information may be used by the prioritize key events module 250 to prioritize the importance of a particular event to the transition and/or to determine the extent of information needed about the key event.

One purpose of the prioritize key events module 250 is to summarize/reduce the information about the key events, focusing on information about the events that will be most important for the driver to consume as part of the handover. The prioritize key events module 250 may use a selection heuristic to determine which events and which pieces of information about the event are important to be included in the summary. The selection heuristic may be a function of (i) the criticality of an event to the current situation evaluated for example by time- and space-dependence and (ii) the potential awareness gaps of the driver with respect to the events (or gaps in information about the events) in order to prioritize the events (or information about a given event) that the driver is most likely to have missed.

For this, the prioritize key events module 250 may consider any of the dimensions discussed above (e.g., time, event category, spatial locality, driver focus/field of view, etc.). Using this information (also known as key event heuristics) the prioritize key events module 250 may make a decision as to which perspectives/points of view should be included in the augmented image sequence (e.g., the sensor stream), which text/metadata should be displayed, and/or the length of the summarization (e.g., the number of frames). The result is an event summarization that includes a sequence summary that may include a summarized image/video as well as an associated textual description of the key event or events.

To perform the prioritized event summarization, the prioritize key events module 250 may use a custom network on top of any of a number of image recognition and summarization algorithms known to those of skill in the art. For example, the prioritize key events module 250 may use a three-dimensional (3D) convolution neural network (e.g., a "Cony-Net" network with a 3D Cony-Net for temporal sequences that follow C3D architecture) to obtain a key feature set. The prioritize key events module 250 may also use a two dimensional (2D) convolutional neural network (e.g., a Cony-Net for action recognition following I3D architecture) to obtain a key feature set. The prioritize key events module 250 may also provide the resulting key feature sets to a principal component analysis (PCA) module with a target length trigger that fuses the feature sets from the 3D and 2D Conv-Nets. The prioritize key events module 250 may provide the fused feature sets to (i) a decoder network that produces the sequence of images 350 for rendering and (ii) to a Long Short-Term Memory (LSTM) network that produces a textual description of the sequence.

Figure 3:
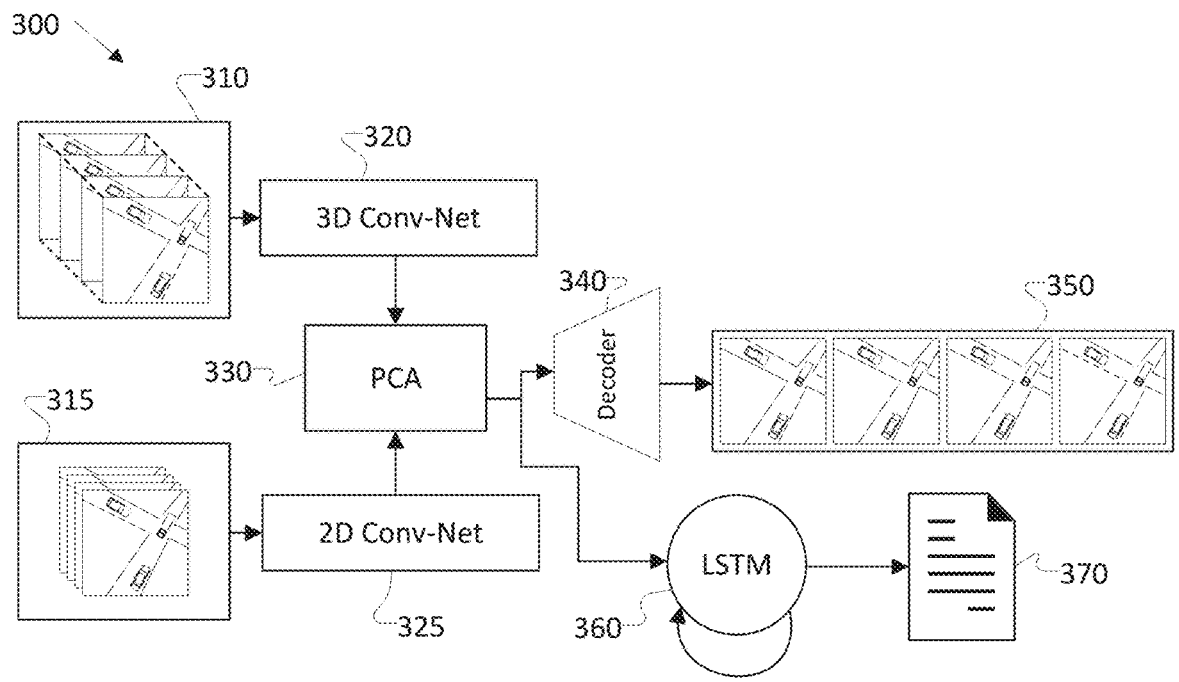
FIG. 3 depicts an exemplary flowchart of event summarization that prioritizes key events of an augmented image sequence.

FIG. 3 shows an exemplary flowchart 300 of event summarization that prioritizes key events module 250 may perform on the information about a key event. For example, flowchart 300 shows a multimodal summarization system where key events module 250 may feed a temporal sequence 310 into a 3D convolution neural network, e.g., 3D Cony-Net 320, that outputs a key feature set associated with the temporal sequence 310. Likewise, key events module 250 may feed image frames 315 into a two-dimensional convolutional neural network, e.g., 2D Conv-Net 325, for action recognition and to output a key feature set associated with the image frames 315. The key feature set associated with the temporal sequence 310 and the key feature set associated with the image frames 315 may flow into a principal component analysis module, e.g., PCA 330, with a target length trigger that fuses the feature sets from 3D Cony-Net 320 and 2D Cony-Net 325. Next, the output of PCA 330 may flow into a decoder network, e.g., decoder 340, that produces the sequence of images for rendering. The output of PCA 330 may also feed into a Long Short-Term Memory network, e.g. LSTM 360, that produces a textual description of the sequence, e.g., textual description 370.

Returning to FIG. 2, the prioritize key events module 250 may summarize multiple key events into a single frame or as a frame of superimposed images, each of which the prioritize key events module 250 may augment with text, descriptions, or other metadata. For example, once the prioritize key events module 250 has generated a textual description of the sequence, the prioritize key events module 250 may select events that may be displayed together in the same environment (e.g., the current environment with respect to the ego vehicle), which may include, for example, events that have occurred in relatively close proximity to the ego vehicle. Then, the prioritize key events module 250 may place portions of the generated text (e.g., a description of the event) and/or additional metadata (e.g., a timestamp, an elapsed time since the event, etc.) on or near the object associated with the event (e.g., the vehicle that created the unsafe condition event) in its current location.

In this context, current location may depend on whether the image is a birds-eye/map view or an augmented reality image (e.g., a forward-facing camera view). If the image is a birds-eye view, the generated text and/or additional metadata may be located next to the respective vehicle. If the images are augmented reality (e.g., a head mounted display or within the vehicle), the generated text and/or additional metadata may be attached as a text tag that points to the appropriate 3D space of the respective object associated with the event. In addition, the prioritize key events module 250 may adjust the object's transparency (in combination with or as an alternative to text) as a way of indicating, for example, the amount of time that has elapsed since the incident associated with the object occurred (e.g., an object associated with an event that occurred long ago is more transparent (and thus deemphasized) as compared to an object associated with an event that occurred very recently).

Figure 4:
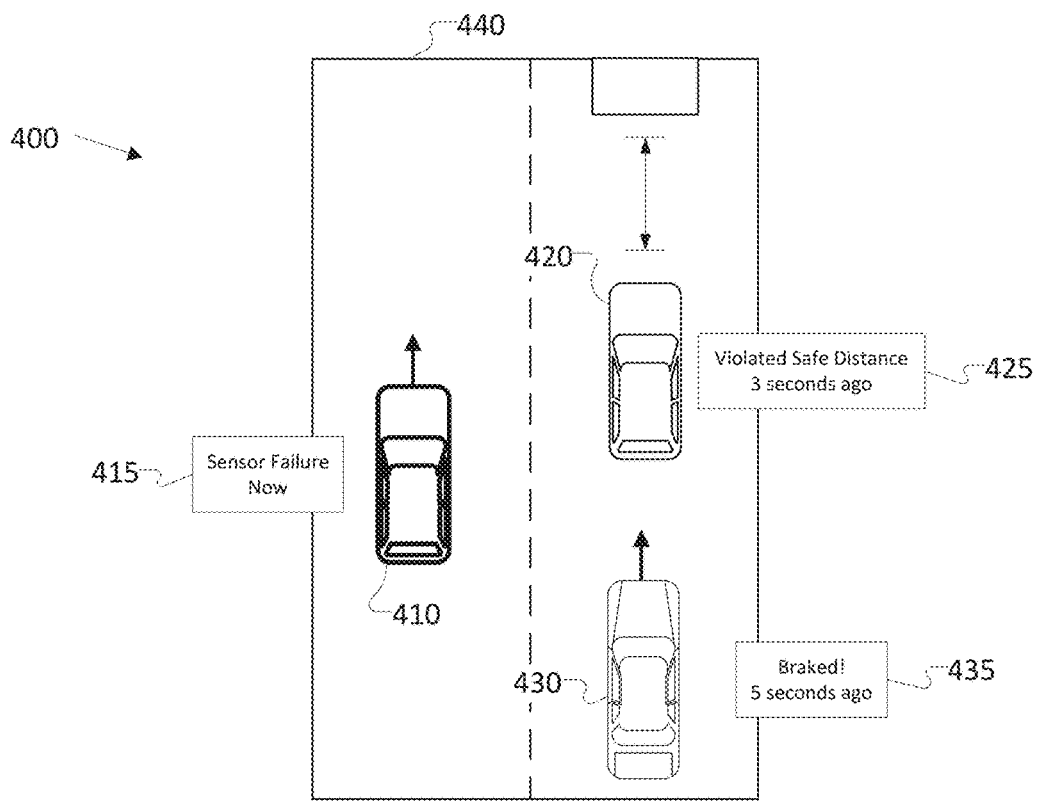
FIG. 4 shows exemplary summarized information about multiple key events displayed in a single frame image of an augmented image sequence.

FIG. 4 shows an exemplary single frame (or frame of superimposed images) 400 that displays summarized information about multiple key events in a single image, as discussed in the proceeding paragraph. Single frame 400 contains three key events, all displayed in the same environment with respect to the ego vehicle 410. These three events are suited to displaying in a single frame because the events have occurred in a relatively close proximity to ego vehicle 410 along road 440. One event relates to nearby vehicle 430 that exhibited an unsafe/unexpected behavior in the form of a braking event. For this event, prioritize key events module 250 summarized the event data by placing an image of nearby vehicle 430 on road 440 at its position in relation to ego vehicle 410, along with a message box 435 indicating the type/name of event (e.g. a braking event) and the time elapsed since the event (e.g., 5 seconds). Another event relates to nearby vehicle 420 that exhibited an unsafe driving event, where vehicle 420 violated the safe distance between vehicle 420 and the object ahead. For this event, prioritize key events module 250 summarized the event data by placing an image of nearby vehicle 420 on road 440 at its position in relation to ego vehicle 410, a double-arrow showing the unsafe distance measurement between vehicle 420 and the object ahead, and a message box 425 indicating the type/name of event (e.g. violated safe distance) and the time elapsed since the event (e.g., 3 seconds). Another event relates to ego vehicle 410 that experienced a sensor failure (which, incidentally, is what triggered the automated driving system's determination to handover control of the ego vehicle 410 to a human driver). For this event, prioritize key events module 250 summarized the event data by placing an image of ego vehicle 410 on road 440 at its current position in relation to vehicles 420 and 430, along with a message box 415 indicating the type/name of event (e.g. sensor failure) and the time elapsed since the event (e.g., now).

As may also be seen in single frame 400, the prioritize key events module 250 has varied the transparency of each vehicle associated with a key event, based on the time elapsed since the event. Thus, ego vehicle 410 is darkly colored with thick lines to visually indicate it is associated with the most recent event, while vehicle 420 is lightly colored with thin lines to visually indicate it is associated with an event that occurred several seconds ago. Of course, single frame 400 is merely an exemplary way of summarizing multiple key events (and data associated with those events) in a single image, and it should be appreciated that prioritize key events module 250 may use different text, perspectives, visual aids, etc. for summarizing information associated with multiple key events to effectively communicate the information to the human driver.

Once summarized, the prioritize key events module 250 (returning to FIG. 2) may pass the summarized key event(s) to the present key events module 260 for communicating it to the driver (e.g., displaying it on a screen (e.g., on the in-vehicle infotainment system)) for driver consumption, as discussed in more detail below.

The present key events module 260 may receive the summarized image sequence and/or textual description of the sequence from the prioritize key events module 250 and prepare it for presentation to the driver in an efficient manner. As part of the preparation, the present key events module 260 may determine or be informed of the urgency of the pending handover. For example, if the handover must be done quickly, then the available time for presenting the information is shorter, and the presentation must be reduced to fit within the short timeframe and the present key events module 260 might need to compress the information, using, for example, a best-effort approach that presents a shorter, less-detailed version of the information while still communicating the key information in the least obstructive way. If a handover is not urgent, the present key events module 260 may present the information in a longer, more-detailed presentation.

The present key events module 260 may use the urgency to determine boundaries for a time window of the presentation. The maximum boundary of the time window may depend on, for example, the amount of time available for the handover (e.g., the maximum amount of time, during which it would be safe to present the information, before the vehicle must release control of the vehicle to the human driver). The minimum boundary of the time window may depend on the minimum time needed to communicate the key events to the driver with sufficient quality (e.g., at 100%, 75%, or 50% quality), while considering the number of events that must be displayed and the length of each event. If the minimum time needed for the replay exceeds the maximum boundary, the present key events module 260 may compress the time needed by removing information about an event or by, for example, following a priority scheme to include only the highest priority events that fit within the maximum boundary. The present key events module 260 may remove information about a key event by sampling a subset of frames in the sequence (e.g., by fast sampling using homogeneous subsampling and/or by priority-based sampling based on a frame importance of each frame that removes less important frames). The present key events module 260 may select key events for inclusion in the presentation by using the priority of each event (e.g., selecting the highest priority event for inclusion in the presentation and selecting the next event (or events) in the priority hierarchy until reaching the maximum boundary of time for the presentation).

The present key events module 260 may adapt the format of the presentation based on the attributes of the passenger that have been monitored by, for example, passenger monitoring module 240. For example, the present key events module 260 may update the format according to the current position of the passenger within the vehicle. Thus, if the passenger monitoring module 240 reports that the driver is seated in the driver's seat and looking to the front at the time the handover is requested, present key events module 260 may adapt the format of the presentation of the key events to be rendered from a vehicle-based perspective in the vehicle display region. Similarly, the passenger monitoring module 240 may report to the present key events module 260 that the passenger is looking at a personal device (e.g., a smart phone or laptop) at the time the handover is requested, so the present key events module 260 may adapt the format to a bird's eye view and send it to the user's personal device.

The present key events module 260 may accept requests from the passenger to review the presentation and/or re-render the presentation from an alternative viewpoint or in an alternative form or format. In addition, if the present key events module 260 receives information from the passenger monitoring module 240 that the passenger's attributes have changed or that the passenger may have missed the presentation (e.g., the passenger was moving to the driver's seat at the time of the presentation), the present key events module 260 may replay the presentation, taking into account the updated attributes of the passenger (e.g. adapting the format of the presentation for the passenger's new position, the current location of the vehicle, etc.).

Figure 5:
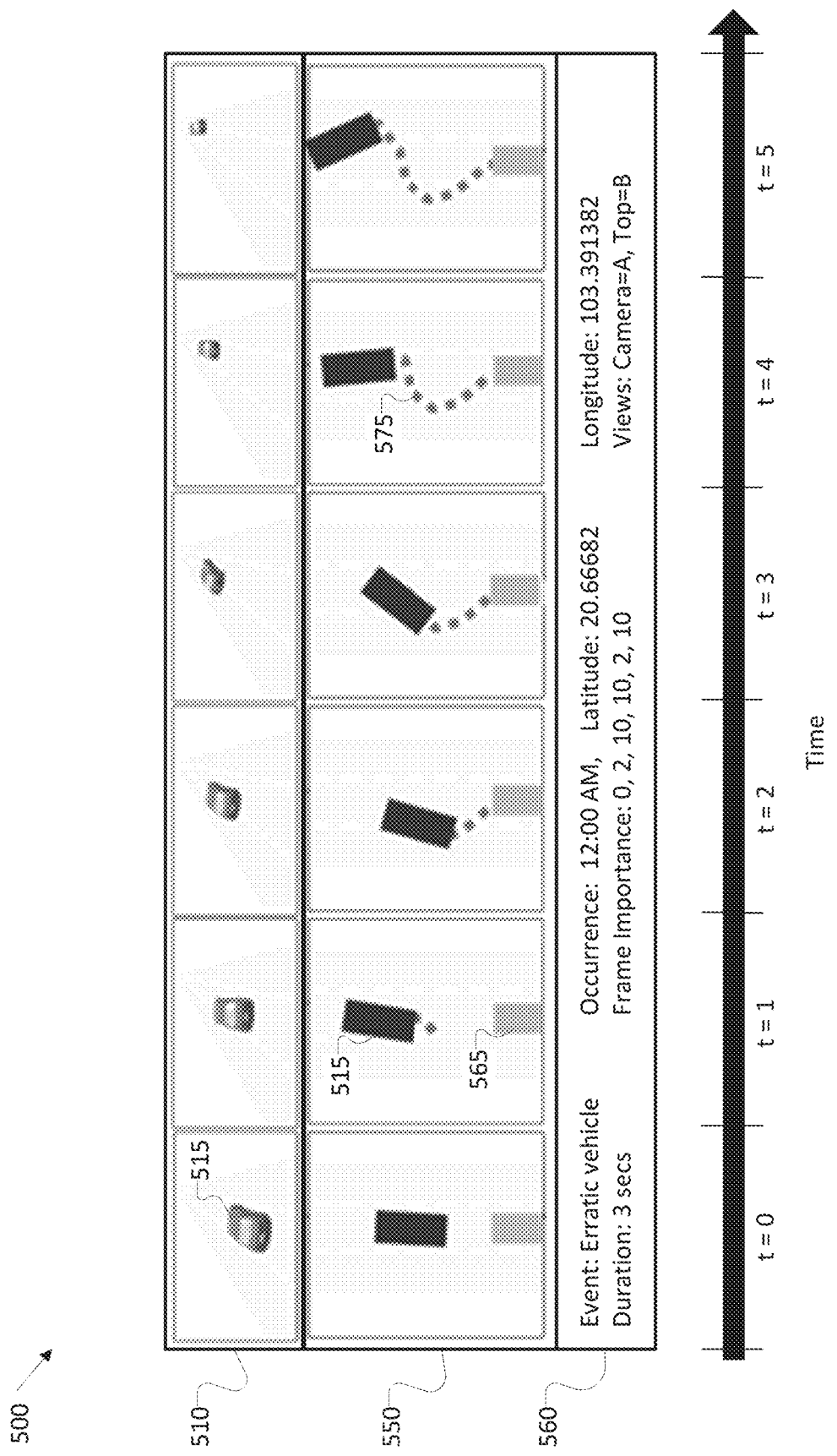
FIG. 5 illustrates an exemplary augmented image sequence that may depict a key event or key events and associated metadata.

FIG. 5 displays an exemplary augmented image sequence 500 that may depict a key event and associated metadata. The system may generate image sequence 500 in a storage module (e.g., store key events module 230 described above with respect to system 200) and may modify the image sequence 500 in a prioritization (e.g. prioritize key events module 250 described above with respect to system 200) and/or a presentation module (e.g., present key events module 260 described above with respect to system 200). In this particular example, it should be understood that the key event is another vehicle (vehicle 515) on the road in front of the ego vehicle (vehicle 565), where the system detected that other vehicle displayed unexpected/unsafe behavior. As depicted in FIG. 5, image sequence 500 may be comprised of multiple perspectives of the key event, where one perspective may be a front camera view from the perspective of a driver sitting in the driver's seat and another perspective may be a birds-eye view from a perspective above the vehicles. The front camera view perspective is depicted in a series of images, front image sequence 510, each of which displays vehicle 515 at different points in time (where increasing time is plotted from left to right on the horizontal axis at t=0, t=1, t=2, . . . , t=5). Similarly, the birds-eye view perspective is depicted in a second series of images, birds-eye image sequence 550, each of which displays vehicle 515 a different points in time as compared to ego vehicle 565 (which is at the bottom of each image).

As should be particularly well understood from birds-eye image sequence 550, the system may augment images sequences so that they do not simply display raw data (e.g. raw camera images from a camera on vehicle 565), but rather may be depictions of a generated scene based on sensor(s) data. The system may have created each of the augmented images in birds-eye image sequence 550, for example, based on sensor data from multiple sensors to generate a birds-eye perspective for which there is no camera (e.g., there may be no birds-eye camera on the ego vehicle to capture this perspective). The system may augment the image sequences, or the individual image frames in the sequence, in other manners, including, for example, to highlight certain image frames, to add callouts identifying objects, to add tracking information for an object, etc. Birds-eye image sequence 550 includes, for example, an augmentation in the form of a track 575 that depicts the movement track of vehicle 575 over time, such that as the time increases, the length of the track increases.

In addition, augmented image sequence 500 may include (e.g., depict) or utilize (e.g., in an augmented image) any of the metadata associated with the key event. In augmented image sequence 500, for example, metadata is displayed as text box 360 under front image sequence 510 and birds-eye image sequence 550. Text box 360 displays, for example, the category of the event (e.g., "Erratic vehicle"), the duration of the event (e.g., 3 seconds), the time of occurrence (e.g., "12:00 AM), the location of the event (e.g., latitude 20.66682 and longitude 103.39182), the relative importance of each frame in the image sequence (e.g., the frame at time 0 has a relative importance of zero, the frame at time 1 has a relative importance of 2, the frame at time 2 has a relative importance of 10, the frame at time 3 has a relative importance of 10, the frame at time 4 has a relative importance of 2, the frame at time 5 has a relative importance of 10), and the perspective of the images (e.g., front camera view is the first sequence (e.g., front image sequence 510) and birds-eye view is the second sequence (e.g., birds-eye image sequence 550)). Of course, the system may use the metadata to summarize the image frame visually, e.g., by labeling, coloring, tracking, modifying, highlighting, etc.

As explained above with respect to vehicle handover system 200 (see FIG. 2), the store key events module 230, the prioritize key events module 250, and the present key events module 260 may receive inputs from the passenger monitoring module 240. The passenger monitoring module 240 may monitor attributes of the passenger, including, for example, the attention of the passenger, the location of the passenger in the vehicle, the reaction time of the passenger, a potential state of confusion of the passenger, and/or any other attribute of the passenger that may be relevant to the handover.

One example of a passenger attribute that the passenger monitoring module 240 may monitor is a reaction time of the passenger. For example, if an event occurs that requires the automated driving system to handover control of the vehicle to the driver, the passenger monitoring module 240 may estimate a response time of the passenger and may also determine a required response time for a particular event. The expected response time and/or required response time may be used by, for example, the store key events module 230 to make decisions about which events to store, which metadata should be stored with the event, and the time period for the stored event. As another example, the expected response time and/or required response time may be used by the prioritize key events module 250 to make decisions about which events to prioritize and how to summarize the data associated with each event. As another example, the vehicle handover system 200 may use the expected response time and/or required response in order to determine, for example, the amount of time needed for the handover and/or whether the handover should proceed at all, given the expected/required response time(s).

By observing how the passenger has responded to previous events (e.g., comparing the driver's actual response to an expected response for an event or simulated event), observing the current environment of the vehicle (e.g., weather, light condition, road geometry, nearby objects, etc.), the current state/attention of the passenger inside the vehicle (e.g., field of view, focus of attention, distracting noises in the vehicle cabin, the driver's profile, etc.), and/or by correlating the information with map-based information, passenger monitoring module 240 may estimate the response time of the passenger and may also determine an required response time for the particular event.

Figure 6:
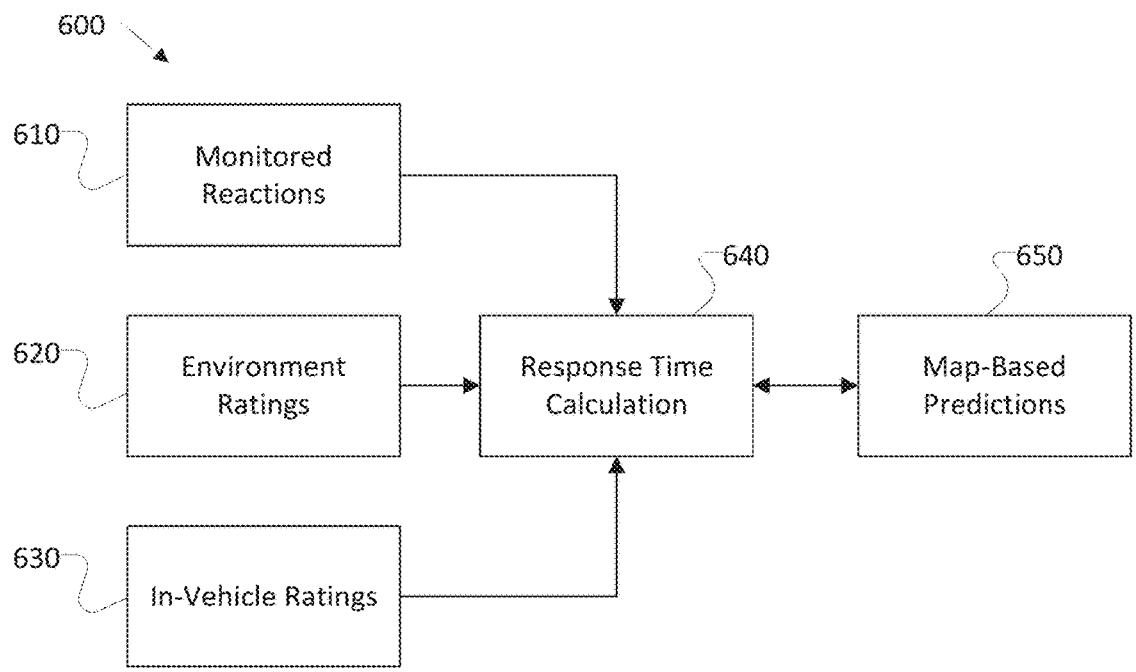
FIG. 6 shows an exemplary flowchart of a response time system for predicting a passenger's expected response time and for determining a required response time at a particular geographic location and situation of the vehicle.

FIG. 6 shows an exemplary flowchart of a response time system 600 for predicting a passenger's expected response time and for determining a required response time at a particular geographic location and situation of the vehicle, which may be implemented as part of passenger monitoring module 240 (see FIG. 2). Response time system 600 may monitor, e.g. in monitored reactions module 610, reactions of the passenger to certain events in order to provide empirical response times for the passenger to the response time calculation module 640. For example, monitored reactions module 610 may detect a monitored event and then measure how quickly a passenger responds to that particular event. To make this determination, the monitored reactions module 610 may use a list of defined event categories and each category's associated responsive action. The monitored reactions module 610 may then calculate the response time as the time between the occurrence of the monitored event and the passenger's performance of the responsive action. To detect a monitored event, the monitored reactions module 610 may use data from any of a number of vehicle sensors and/or vehicle systems that sense the environment, movement of the vehicle, detect objects, etc. (e.g., cameras, LiDAR sensors, vehicle position sensors, vehicle speed sensors, accelerometers, gyroscopes, etc.). Once the monitored reactions module 610 detects a monitored event, it may determine the predefined responsive action associated with the event (e.g., via a look-up table of events and/or event categories).

Figure 7:
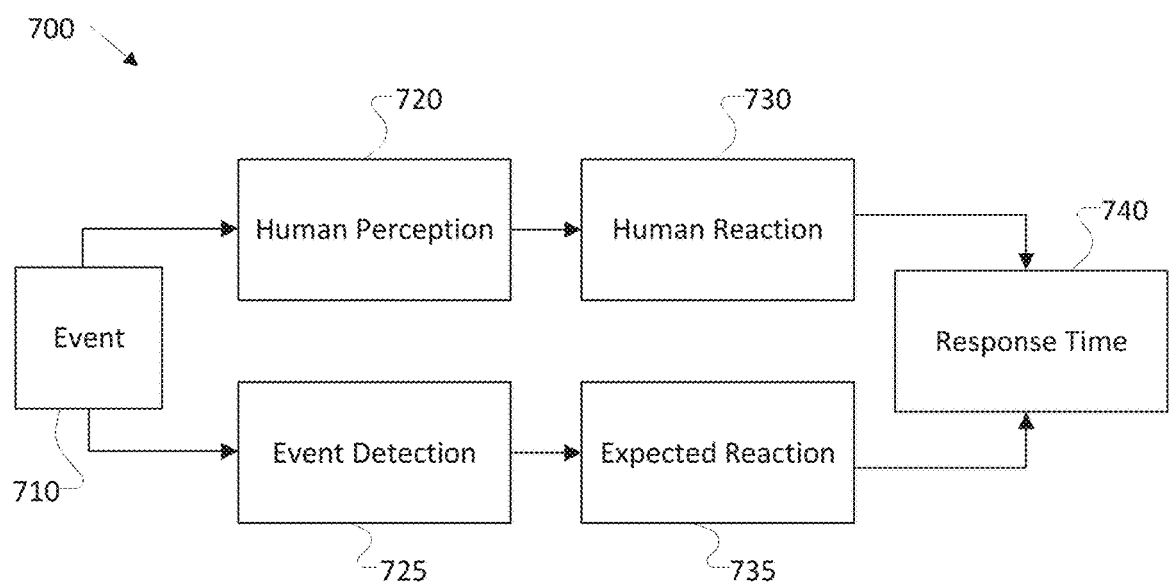
FIG. 7 depicts an exemplary flowchart for determining a response time of a passenger to a monitored event.

FIG. 7 shows an exemplary flowchart 700 of an implementation of how the monitored reactions module 610 (see FIG. 6) may use an event to obtain an empirical response time for a particular monitored event. In 710, for example, an event occurs that may be a measurable event. As one example, this could be a traffic light that has changed from red to green while the vehicle has been stopped. On the system side, the system (e.g., the monitored reactions module 610 of FIG. 6) detects the traffic light change to green, in 725, and determines, in 735, that the associated responsive action to the traffic light change is for the driver to press the accelerator so that the vehicle begins to move. One the human driver side, after an event occurs, it will take the driver some amount of time to perceive the event, in 720, and effect the appropriate responsive action, in 730. In 740, the response time is calculated by computing the time it took for the human driver to take the action after the occurrence of the monitored event.

Returning to FIG. 6, the monitored reactions module 610 may monitor numerous types of events, not only the example traffic light event described above with respect to FIG. 7, but also more subtle and/or more sophisticated events/responsive actions. For example, the monitored events may include new road conditions or a new speed limit sign (e.g., a traffic sign event) that necessitates a speed change, approaching objects to which the vehicle should yield (e.g., a traffic situation or an approaching vehicle with higher priority (e.g., a right-of-way event)), the appearance of an unexpected object that necessitates a braking, decelerating, accelerating, or a lane change action (e.g., a stopping event, a turning event, a deceleration event, an acceleration event, etc.), and/or an approaching curve event (e.g., a turning event) that necessitates the actions of slowing down and turning the wheel. In addition to actual events, the events may be simulated by the monitored reactions module 610. For example, the vehicle may generate a simulated event as a warning message that is displayed to the driver (or audible tone or message), and the associated responsive action may include pressing a requested button or providing an audible confirmation. The simulated event may also include a question about a particular event scenario, where the responsive action is to select the correct response to the question, and the empirical response time is the time it takes for the driver to answer correctly.

Monitored reactions module 610 may measure any number of empirical response times for a passenger and provide them to the response time calculation module 640. If the monitored reactions module 610 makes numerous empirical response measurements for a given passenger, the response time calculation module 640 may estimate an average reaction time of the particular passenger. The average reaction time may be an average reaction time for all events, or the response time calculation module 640 may classify each event into a larger category of events (e.g. traffic signs/signals events, intersection/priority events, unexpected/sudden braking events, etc.), such that response time calculation module 640 may calculate an average reaction time for the event category. The average may be a simple average or may be a moving average, where the moving average may help reduce the influence of any one particular event (e.g., a single instance of a slow reaction time) on the overall average. A possible moving average may be calculated as $\rho_{new} = \alpha \rho_{event} + (1-\alpha)\rho_{old}$, where $\alpha$ is a weighting factor and $\rho_{new}$ is the new average response time, $\rho_{event}$ is the response time for the current event, and $\rho_{old}$ is the previous average response time.

Response time system 600 may also determine environment ratings, e.g., in 620, which may be provided to and used in the response time calculation module 640. Because human response time while driving may depend on the current environment of the vehicle (e.g., weather experienced at the vehicle or approaching, light level/condition at the vehicle or approaching, road geometry, road type, speed of the vehicle, air temperature at the vehicle, the existence of nearby objects, etc.), the response time calculation module 640 may use inputs from an environmental ratings module 620 to calculate an expected response time. One example of an environmental rating that may be provided by the environmental ratings module 620 is a visibility rating. For example, the environmental ratings module 620 may detect areas of low contrast (e.g., cased by shadows, nightfall) or detect areas that may impact the speed at which a human driver's eyes adjust (e.g., an area that switches quickly from very bright surroundings to very dark surroundings), and then calculate visibility rating factor that the response time calculation module 640 may use for rating the response time.

As another example of an environmental rating that may be provided by the environmental ratings module 620 is a crowdedness rating. For example, the environmental ratings module 620 may detect the number of objects in the environment, the number of objects that are moving, the distance between objects, the flow of objects near the vehicle, etc., and then calculate a crowdedness rating factor that may be provided to the response time calculation module 640 for rating the response time. Another example of an environmental rating that may be provided by the environmental ratings module 620 is an occlusion rating. For example, the environmental ratings module 620 may locate occluded areas that, because the driver's view is blocked, may have a higher risk of an object appearing suddenly. The occlusion rating may take into account whether the driver is focused or frequently checks the occluded area (e.g., by tracking the driver's head, eyes, etc.), because if the driver is focused on the occluded area, the driver may be more prepared to react (e.g., a faster response time) to an object suddenly appearing from behind the occluded area. On the other hand, if a driver does not spend much time looking at the occluded area, the driver may be less prepared to react (e.g., a slower response time) to an object suddenly appearing from behind the occluded area.

Response time system 600 may also determine in-vehicle ratings, e.g., in 630, which may be provided to and used in the response time calculation module 640. Because human response time while driving may depend on the driver's attention rating (e.g., based on observed characteristics about the passenger such as head direction, eye direction, body pose, heart rate, non-driving activities (e.g. a secondary activity such as talking on the phone, changing the radio, talking to another passenger, taking a drink or eating food, etc.), noise in the vehicle cabin, driving habits, etc.), the response time calculation module 640 may use inputs from an in-vehicle ratings module 630 to calculate an expected response time. For example, the driver's head direction may be detected by in-vehicle sensors (e.g., a camera) to estimate in which direction the driver's attention is focused. Similar sensing may detect the eye direction and body pose to rate the attention of the driver based on these in-vehicle observations. For example, the in-vehicle ratings module 630 may determine from observed characteristics of the driver's head, eyes, body pose, etc. an expected field of view of the driver, where the in-vehicle rating of the response time may be faster for events occurring near the center of the field of view and the in-vehicle rating of the response time may be slower for events that occur near the periphery of the field of view. As another example, the in-vehicle ratings module 630 may also monitor the driver's reaction to external events, by, for example, observing whether the driver turns his/her head towards a sound (e.g., a horn or an emergency vehicle siren) to provide a rating for the response time.

The in-vehicle ratings module 630 may continuously/repeatedly monitor the state of the driver (e.g., in the context of the current environment/operation of the vehicle) to determine an in-vehicle rating, using any number of observations over time. For example, in-vehicle ratings module 630 may use the driver profile to provide an in-vehicle rating, recognizing that response time may depend on age (e.g., younger passenger may have a faster response than an elderly passenger), driving style, physiology (e.g., persons with shorter legs/arms may not be able to react as quickly), or other driver observations/demographics. These driver observations may be combined with other types of passenger observations to arrive at the in-vehicle rating. For example, the body pose or position of the person with respect to the steering wheel may improve or worsen the rating (e.g., a driver that has shorter arms may have a slower rating unless they are sitting closer to the steering wheel to compensate). As another example, the heart rate might impact the rating where a person's rating my be lowered if the person has a low heart rate, because the person may be close to dozing off and have a slower reaction time. As another example, a person's activity within the vehicle may impact the rating because a passenger that is frequently controlling the radio, checking a smartphone, sneezing, and/or in a lively discussion, the response time may be longer, so the in-vehicle ratings module 630 may adjust the rating accordingly. As another example, the in-vehicle ratings module 630 may monitor the driver's driving behavior over time to inform the in-vehicle rating. For example, if the in-vehicle ratings module 630 determines that the driver frequently switching between no steering and abruptly steering, this suggests a high level of distraction and a poor response time, so the in-vehicle ratings module 630 may adjust the rating accordingly.

Response time system 600 may also collect map-based data, e.g., in 650, which may be provided to and used in the response time calculation module 640. For example, the required response time may depend on the road location, structure, and surrounding objects, where these map-based factors may impact the ability of the driver to see and react to unforeseen events. On a straight road in a rural area, for example, the required response time might be longer (e.g., due to the lack of stimulus) than it would be in an urban area at an intersection or at a pedestrian crossing (e.g., where there are many stimuli to keep the driver focused on reacting to events). The required response time may depend on other map-based data, such as whether the road is close to a school, is filled with commercial billboards or other distracting objects, or is part of a confusing intersection. Map-based predictions module 650 may use such map-based data to determine a map-based required response time prediction.

The map-based predictions module 650 may use a multi-layered approach to determine a map-based required response time. A first layer may include static map data (e.g., a pre-generated response time map), a second layer may include environment data (e.g., an environment-dependent response time map), a third layer may include driver data/prediction data (e.g., a driver-dependent response time map for the driver of the vehicle), and a fourth layer may include other driver data/prediction data (e.g., a shared response time map based on other driver's responses (e.g., an average driver response time) at the map location). Any, some, or all of the layers may be used to generate, confirm, or adjust the resulting map-based required response time. The map-based predictions module 650 may use locally stored data (e.g., at the vehicle) or data that the map-based predictions module 650 obtains from a cloud-based service. In particular, the fourth layer that includes other driver data/prediction data may be particularly suited to a cloud-based service, given that the data may include shared data from other drivers and external sources.

In the static map layer (e.g., the first layer), the map-based predictions module 650 may generate a required response time for a given map location. The static map layer may use the road geometry/layout, the nearby objects (e.g., buildings, vegetation, billboards that may influence response times due to occlusions, speed limits, or frequency of events that occur at the map location). For example, at a signaled intersection with a traffic light, the required response time may be lower (faster) because the driver may need to quickly react when the traffic light turns red.

In the environment data layer (e.g., the second layer), the map-based predictions module 650 may adjust the required response time based on the environment of the vehicle at a particular map location. The environmental data layer may receive sensed, recorded, and/or tracked information about the environment around the vehicle, the movement of the vehicle, and the movement of objects proximate the vehicle, obtained locally from any number of sensors, including, as examples, cameras, light detection and ranging (LiDAR) sensors, vehicle position sensors, vehicle speed sensors, accelerometers, gyroscopes, etc., or from external sources. For example, the environment data layer may adjust the required response time for a map location based on the time of day (e.g. a faster response time may be required during the day (e.g., at/near a location with a school at times when students may be present)), based on the weather (e.g. a faster response time may be required due to lower visibility during a rainstorm), and/or based on the landscape at the location (e.g., an open road versus a forest road). Of course, the environment data layer may use any number of environmental factors to adjust the required response time at the map location, and each environmental factor may have a different impact when considered in combination (e.g., bad weather might have a different influence on reaction time depending on the landscape at the location).

In the driver data/prediction layer (e.g., the third layer), the map-based predictions module 650 may adjust the required response time based on driver observations that may relate to the particular map location. For example, if the driver data/prediction layer learns that the driver might be distracted at the particular map location (e.g., the driver is interested in a certain brand of merchandise that is advertised at the location or has a retail store at the location, or if the driver has a friend that lives nearby the map location), the driver data/prediction layer may adjust the required response time to account for the driver's potential distraction at this location. The driver data/prediction layer may also be used to normalize the response times generated/adjusted in the static map layer (e.g., the first layer) and/or the environment data layer (e.g., the second layer) based on the driver-specific data in the driver data/prediction layer. For example, if the driver data/prediction layer determines that the driver is an elderly driver who has higher response times, the driver data/prediction layer may increase all of the required response times associated with the map data.

In the other driver data/prediction layer (e.g., the fourth layer), the map-based predictions module 650 may adjust the required response time based on information about other drivers' reaction times at the particular map location. As noted earlier, this layer may be particularly suited to utilize a cloud-based data repository, so that driver response times can be aggregated (e.g., crowd sourced) from many other drivers, and so that the response times calculated by the response time calculation module 640 might be sent (anonymized) to the cloud-based repository, where it may apply a learning algorithm (e.g., a neural network) to improve adjustments to response time based on the impact of each measurement. The cloud-based data repository may include spatial, temporal, and event properties associated with each driver's response time so that the other driver data/prediction layer may use this data to refine the required response time for a specific map location at a specific time of day. For example, the cloud-based data associated with a forest road at dusk may indicate many other drivers experienced emergency braking events or accidents (e.g., due to deer crossing the road) associated with this map location at this time of day. Thus, the other driver data/prediction layer may reduce the required response time for this map location so that it is below a threshold level, e.g. for safety reasons, in anticipation of a similar event occurring. The other driver data/prediction layer may also utilize or provide user profile data associated with a particular driver so that driver-specific adjustments may follow the driver from one vehicle to another vehicle.

Response time system 600 may use, e.g. in 640, the information received from map-based prediction module 650 (and/or with ratings from the monitored reactions module 610, environment ratings module 620, and/or in-vehicle ratings module 610) to determine a predicted response time of the passenger and a required response time for the vehicle/driver's situation at the particular vehicle location. The response time calculation module 640 may be located in the vehicle (e.g., an on-board processor/memory) or may be cloud-based. Based on the received information from other modules, the response time calculation module 640 may use a prediction algorithm to calculate the predicted response time ($\rho_{total}$) of the passenger according to, for example, the following formula:

$$\rho_{total} = \max\{\rho_{min}, (\rho_{driver} - \rho_{driver,baseline}) + \rho_{map} + \rho_{in\text{-}vehicle}\}$$

In the above exemplary formula, $\rho_{min}$ is the minimum response time (e.g., based on the minimum time set by regulatory authorities for a minimum handover time from an automatic driving mode to a manual driver). $\rho_{driver}$ is the response time rating that is unique to the specific driver, which is offset by a baseline response time rating, $\rho_{driver,baseline}$, associated with a particular situation/environment (e.g., from monitored reactions module 610). $\rho_{map}$ is the response time adjustment for the map location/environment ratings (e.g., from environment ratings module 620), and $\rho_{in\text{-}vehicle}$ is the adjustment for in-vehicle ratings (e.g., from in-vehicle ratings module 630).

As mentioned above, response time system 600 may be implemented as part of passenger monitoring module 240 (see FIG. 2) of a vehicle handover system. In addition to providing response times to the vehicle handover system, response time system 600 may also provide the passenger response time to other types of vehicle systems, such as a vehicle safety system that determines whether the vehicle should take action (e.g., to brake, to turn the steering wheel, to decelerate, etc.). For example, if the passenger's expected response time to react to a particular event exceeds a safe response time determined by the vehicle safety system, the vehicle may perform the required action rather than waiting for the driver to react.

In another aspect, response time system 600 may also provide the passenger response times for a given map location and given vehicle situation to an automated driving system to determine the parameters for the automated driving system. For example, if the predicted response time of the passenger is longer (e.g., slower) than the minimum required response time for the vehicle situation, the automated driving system may use the response time to limit a driving parameter (e.g. set a maximum speed) or to disable the automated driving system altogether. As an example, assume a vehicle is in an automatic driving mode and approaches a curvy road with occlusions. If the driver is distracted, the response time system 600 may report a passenger response time that is longer than the required response time for the current conditions. So, the driver may be unable to safely assume control of the vehicle in the curve, if were to become necessary. As a result, the system may warn the driver (e.g., with an audible, visual, or haptic alarm), ask the driver to confirm his/her focus (e.g. by requesting that the driver press a button or speak an audible reply), and/or disable the automatic driving functionality altogether (e.g., safely bring the vehicle to a stop).

While the response time system 600 has been described above with respect to determining response times for the driver of the ego vehicle, the response time system 600 is not limited in this respect. The response time system 600 may analyze the response time of pedestrians or other traffic participants based on the same type of analysis. The response time system 600 may provide response time information for these other targets (e.g., pedestrians or other traffic participants) to the safety system of the vehicle (e.g., to determine how quickly a particular object is expected to react to other objects in a particular scene/constellation) or to infrastructure equipment (e.g., traffic monitoring equipment, traffic lights, etc.) in order to allow them to analyze the overall situation and/or to publish the calculated response times to other traffic participants.

As noted above, passenger monitoring module 240 (see FIG. 2) may monitor numerous types of events (including simulated events) and the passenger's reaction to those events to determine, for example, a response time of a passenger (see, for example, the discussion above with respect to FIGS. 6 and 7). In addition to response time, the passenger monitoring module 240 may use this event-based information to determine whether the passenger is confused about the current situation of the vehicle (e.g., a "mode confusion" of the passenger). For example, if the passenger was expected to react to an event with a particular reaction (e.g., turn the wheel in response to an approaching curve or an object appearing in the road), but instead reacted differently (e.g., performed an unsafe action or failed to act), the passenger monitoring module 240 may determine that passenger is suffering from mode confusion. As also noted above, the passenger monitoring module 240 may generate a simulated event to gage whether the passenger is apprised of the current situation of the vehicle or whether the passenger is suffering from mode confusion. For example, the passenger monitoring module 240 may display a warning message (e.g., on a display or as an audible tone/speech) that requests a particular response (e.g., pressing a certain button or speaking a certain audible response), and the passenger monitoring module 240 may determine mode confusion if the passenger provides an incorrect response (e.g., pressing a different button, not responding, or providing an unexpected audible response).

The simulated event may also include a question posed about a particular event scenario that has an expected answer (e.g., a correct answer from multiple-choice list of possible answers), and the passenger monitoring module 240 may determine mode confusion if the passenger provides an incorrect answer (e.g., selects the wrong answer from the multiple-choice list). If there is mode confusion, the vehicle handover system 200 may decline to handover control of the vehicle from an automatic driving mode to the mode-confused passenger. In addition, the mode confusion may be used by the store key events module 230, prioritize key evens module 250, and/or the present key events module 260 to determine which events and to what extent the event should be stored, prioritized, or presented (e.g., the length of the events, the priority of the events, and the length/summarization of information in the event depending on whether the passenger exhibits frequent mode confusion in recurring situations).

Figure 8:
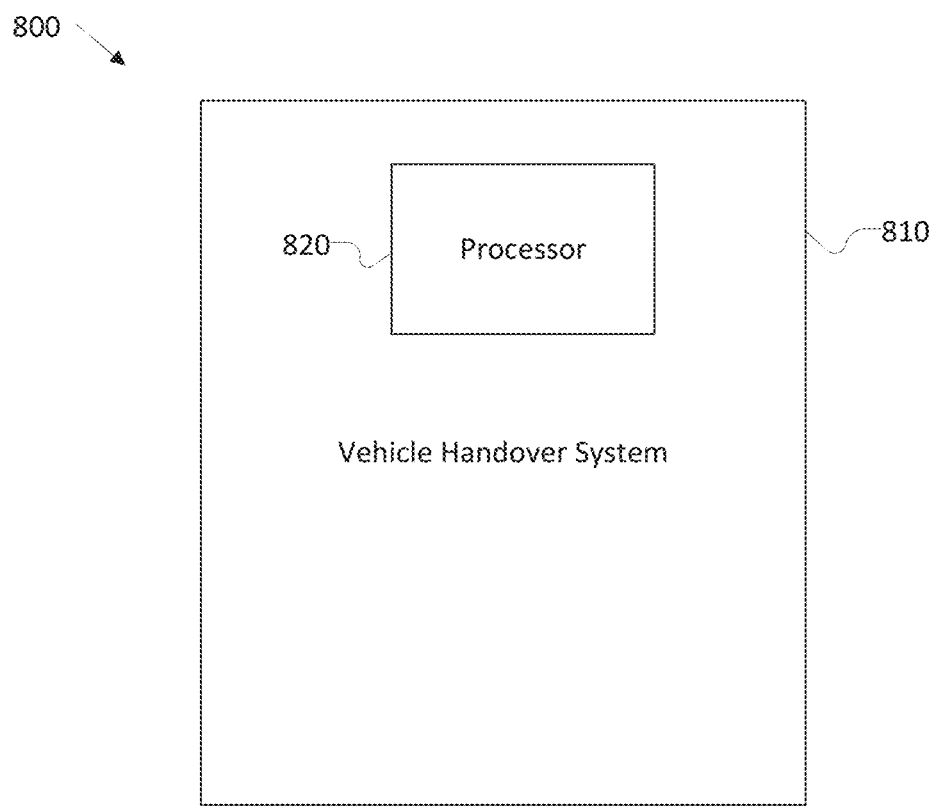
FIG. 8 shows an exemplary schematic drawing illustrating a device for handing over control of a vehicle from an automatic driving mode to a manual driving mode.

FIG. 8 is a schematic drawing illustrating a device 800 for assisting in vehicle handovers. The device 800 may include any of the features described above. FIG. 8 may be implemented as an apparatus, a method, and/or a computer readable medium that, when executed, performs the features described above. It should be understood that device 800 is only an example, and other configurations may be possible that include, for example, different components or additional components.

Device 800 includes a vehicle handover system 810. The vehicle handover system 810 includes a processor 820. In addition or in combination with any of the features described in the following paragraphs, the processor 820 of vehicle handover system 810 is configured to monitor an environment of a vehicle. The processor 820 is also configured to receive a transition request to change control of the vehicle from an automated driving mode to a passenger of the vehicle. The processor 820 is also configured to detect a key event that may be relevant to the transition request. The key event is based on the monitored environment. The processor 820 is also configured to generate a handover scene that includes images associated with the key event. The images include an image sequence over a time-period of the key event. Before control of the vehicle is changed from the automated driving mode to the passenger, the processor 820 is also configured to display the handover scene to the passenger.

Furthermore, in addition to or in combination with any one of the features of this and/or the preceding paragraph with respect to vehicle handover system 810, the key event may include at least one of a movement event that has caused or may cause a change in a trajectory of the vehicle, an unexpected behavior event of an observed vehicle in the monitored environment of the vehicle, and/or an outside operational domain event that includes an operational setpoint for the vehicle that does not conform to an expected operating condition of the vehicle. Furthermore, in addition to or in combination with any one of the features of this and/or the preceding paragraph with respect to vehicle handover system 810, the images may further include event metadata associated with the key event. The event metadata includes at least one of a kind of the key event, a time of the key event, a location of the key event, a duration of the key event, an importance of each of the images associated with the key event, and/or an image viewpoint of each of the images associated with the key event. Furthermore, in addition to or in combination with any one of the features of this and/or the preceding paragraph with respect to vehicle handover system 810, the images may be generated from sensor data about the vehicle. Furthermore, in addition to or in combination with any one of the features of this and/or the preceding paragraph with respect to vehicle handover system 810, the images may include an augmented image sequence generated from at least one camera image that may be augmented with the event metadata.

Furthermore, in addition to or in combination with any one of the features of this and/or the preceding two paragraphs with respect to vehicle handover system 810, the handover scene may include a plurality of perspectives that correspond to a passenger viewpoint of the passenger. Furthermore, in addition to or in combination with any one of the features of this and/or the preceding two paragraphs with respect to vehicle handover system 810, the plurality of perspectives may include a front-facing camera perspective, a bird's-eye perspective, and/or a map-based perspective of the vehicle. Furthermore, in addition to or in combination with any one of the features of this and/or the preceding two paragraphs with respect to vehicle handover system 810, the handover scene may include a static image formed from the images and/or the event metadata associated with a plurality of key events. Furthermore, in addition to or in combination with any one of the features of this and/or the preceding two paragraphs with respect to vehicle handover system 810, the static image may include at least one of a single frame of one of the images associated with the plurality of key events and/or a superimposed image based on superimposing one or more of the images associated with the plurality of key events.

Furthermore, in addition to or in combination with any one of the features of this and/or the preceding three paragraphs with respect to vehicle handover system 810, the handover scene further may include text associated with the images. The text may be generated from the images using a multimodal summarization system. Furthermore, in addition to or in combination with any one of the features of this and/or the preceding three paragraphs with respect to vehicle handover system 810, the text may include a description of the key event and a time at which the key event occurred. Furthermore, in addition to or in combination with any one of the features of this and/or the preceding three paragraphs with respect to vehicle handover system 810, the text may include a description of the key event that may be verbalized to the passenger through an audio system of the vehicle. Furthermore, in addition to or in combination with any one of the features of this and/or the preceding three paragraphs with respect to vehicle handover system 810, the time may be an elapsed time since the key event occurred.

Furthermore, in addition to or in combination with any one of the features of this and/or the preceding four paragraphs with respect to vehicle handover system 810, the key event may be assigned a priority that corresponds to an importance of the key event as compared to a current situation of the vehicle. Furthermore, in addition to or in combination with any one of the features of this and/or the preceding four paragraphs with respect to vehicle handover system 810, the priority may be based on at least one of an elapsed time since the key event occurred, a category of the key event, a distance from an event location of the key event to a current location of the vehicle, and/or a likelihood that the passenger is already aware of the key event. Furthermore, in addition to or in combination with any one of the features of this and/or the preceding four paragraphs with respect to vehicle handover system 810, the current location of the vehicle may include an expected location of the vehicle after the elapsed time. Furthermore, in addition to or in combination with any one of the features of this and/or the preceding four paragraphs with respect to vehicle handover system 810, the processor 820 may be further configured to monitor the passenger to determine the likelihood that the passenger is already aware of the key event.

Furthermore, in addition to or in combination with any one of the features of this and/or the preceding five paragraphs with respect to vehicle handover system 810, the processor 820 may be further configured to determine a presentation duration for presenting the handover scene to the passenger. The presentation duration may depend on an urgency of the transition request. Furthermore, in addition to or in combination with any one of the features of this and/or the preceding five paragraphs with respect to vehicle handover system 810, the processor 820 may be further configured to compress a length of the handover scene to fit within the presentation duration. Furthermore, in addition to or in combination with any one of the features of this and/or the preceding five paragraphs with respect to vehicle handover system 810, compressing the length may remove a portion of image data associated with the images from the handover scene based on an importance of the portion to the key event. Furthermore, in addition to or in combination with any one of the features of this and/or the preceding five paragraphs with respect to vehicle handover system 810, the handover scene may include a plurality of key events. Compressing the length may be configured to remove at least one of the plurality of key events from the handover scene based on a priority of the at least one of the plurality of key events.

Furthermore, in addition to or in combination with any one of the features of this and/or the preceding six paragraphs with respect to vehicle handover system 810, the processor 820 may be further configured to store the handover scene as a stored handover scene and to display the stored handover scene to the passenger based on a request to review the stored handover scene. Furthermore, in addition to or in combination with any one of the features of this and/or the preceding six paragraphs with respect to vehicle handover system 810, generating the handover scene may depend on an expected response time of the passenger. Furthermore, in addition to or in combination with any one of the features of this and/or the preceding six paragraphs with respect to vehicle handover system 810, the expected response time may be based on an average response time of the passenger to a plurality of monitored events. Furthermore, in addition to or in combination with any one of the features of this and/or the preceding six paragraphs with respect to vehicle handover system 810, the plurality of monitored events may include at least one of a traffic sign event, a right-of-way event, a stopping event, a turning event, a deceleration event, and/or an acceleration event.

Furthermore, in addition to or in combination with any one of the features of this and/or the preceding seven paragraphs with respect to vehicle handover system 810, the expected response time may be adjusted based on an environmental rating of the monitored environment of the vehicle. Furthermore, in addition to or in combination with any one of the features of this and/or the preceding seven paragraphs with respect to vehicle handover system 810, the monitored environment may include at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle. Furthermore, in addition to or in combination with any one of the features of this and/or the preceding seven paragraphs with respect to vehicle handover system 810, the expected response time may be adjusted based on an attention rating of the passenger that depends on an observed characteristic of the passenger. Furthermore, in addition to or in combination with any one of the features of this and/or the preceding seven paragraphs with respect to vehicle handover system 810, the observed characteristic of the passenger may include at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Furthermore, in addition to or in combination with any one of the features of this and/or the preceding eight paragraphs with respect to vehicle handover system 810, the non-driving activity of the passenger may include a secondary activity in which the passenger is engaged. Furthermore, in addition to or in combination with any one of the features of this and/or the preceding eight paragraphs with respect to vehicle handover system 810, the expected response time may be adjusted based on a geographic location of the vehicle and map-based information associated with the geographic location. Furthermore, in addition to or in combination with any one of the features of this and/or the preceding eight paragraphs with respect to vehicle handover system 810, the map-based information may include at least one of a road curvature, a road visibility, a density of nearby objects, and/or a road quality at the geographic location. Furthermore, in addition to or in combination with any one of the features of this and/or the preceding eight paragraphs with respect to vehicle handover system 810, the map-based information may include a baseline reaction time offset associated with an average reaction time for the geographic location. Furthermore, in addition to or in combination with any one of the features of this and/or the preceding eight paragraphs with respect to vehicle handover system 810, the average response time may be stored in a database of average response times associated with the passenger. The database of average response times may be updated with the adjusted expected response time.

Furthermore, in addition to or in combination with any one of the features of this and/or the preceding nine paragraphs with respect to vehicle handover system 810, the database of average response times may include average response times associated with other drivers. Furthermore, in addition to or in combination with any one of the features of this and/or the preceding nine paragraphs with respect to vehicle handover system 810, the processor 820 may be further configured to determine a minimum response time required to implement the transition request to change control of the vehicle to the passenger. Furthermore, in addition to or in combination with any one of the features of this and/or the preceding nine paragraphs with respect to vehicle handover system 810, the image sequence over the time-period of the key event may be based on the minimum response time. Furthermore, in addition to or in combination with any one of the features of this and/or the preceding nine paragraphs with respect to vehicle handover system 810, if the expected response time is slower than a minimum response time, the vehicle handover system 810 may deny the request for the transition. Furthermore, in addition to or in combination with any one of the features of this and/or the preceding nine paragraphs with respect to vehicle handover system 810, if the expected response time is faster than a minimum response time, the vehicle handover system 810 may proceed with the requested transition.

Furthermore, in addition to or in combination with any one of the features of this and/or the preceding ten paragraphs with respect to vehicle handover system 810, the observed characteristic of the passenger may include a mode confusion of the passenger. The mode confusion may be determined based on comparing an expected action of the passenger to an observed action of the passenger. Furthermore, in addition to or in combination with any one of the features of this and/or the preceding ten paragraphs with respect to vehicle handover system 810, the expected action may include an expected response to a question posed to the passenger about a simulated driving situation. The observed action may include a provided response to the question from the passenger. Furthermore, in addition to or in combination with any one of the features of this and/or the preceding ten paragraphs with respect to vehicle handover system 810, the expected action may be based on a current operating state of the vehicle and a set of expected vehicle maneuvers associated with the current operating state. The mode confusion may be based whether the observed action is at least one vehicle maneuver in the set of expected vehicle maneuvers. Furthermore, in addition to or in combination with any one of the features of this and/or the preceding ten paragraphs with respect to vehicle handover system 810, the processor 820 may be further configured to grant or deny the transition request based on the mode confusion.

Figure 9:
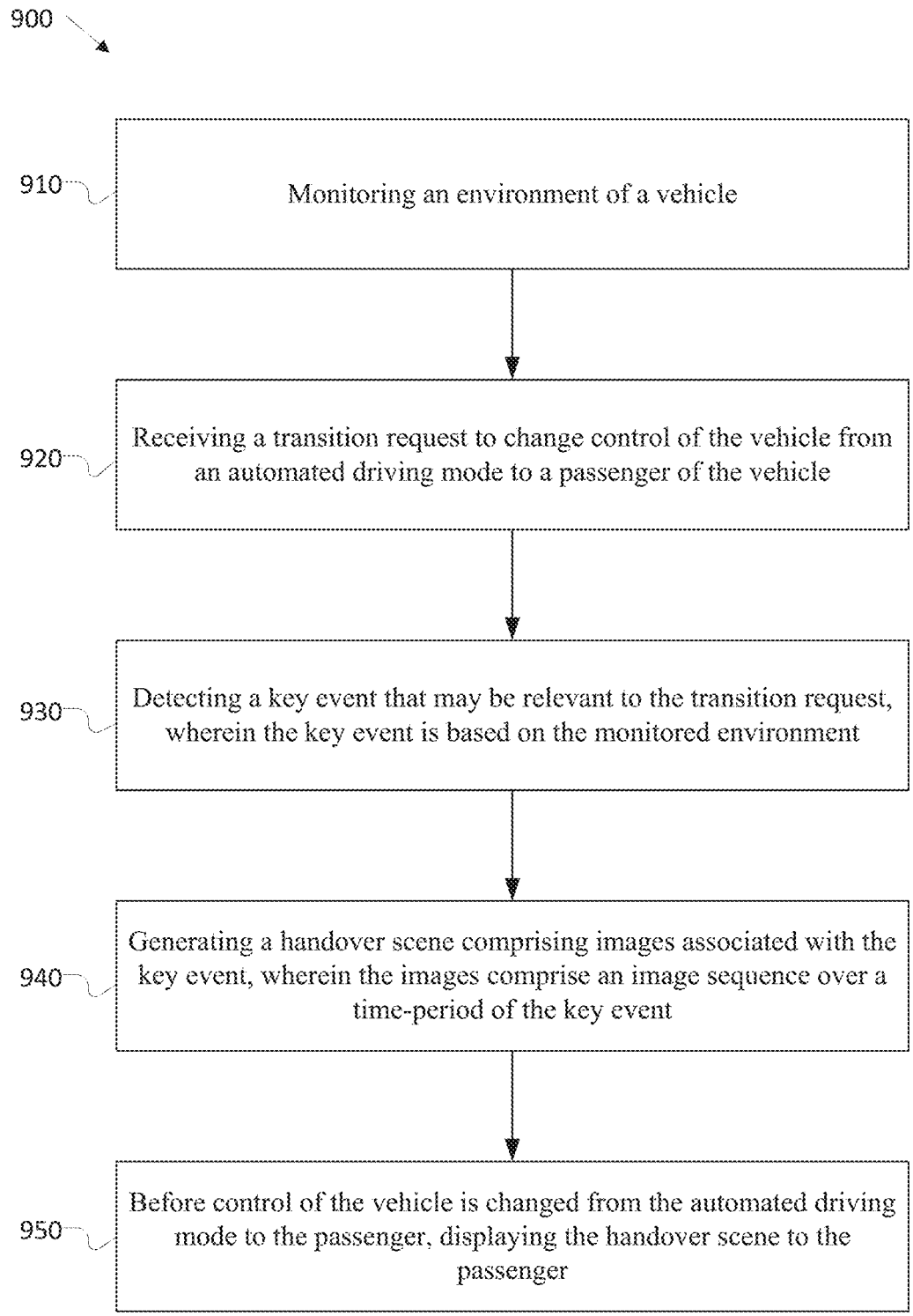
FIG. 9 depicts a schematic flow diagram of a method for handing over control of a vehicle to a passenger.

FIG. 9 depicts a schematic flow diagram of a method 900 for assisting in vehicle handovers. Method 900 may implement any of the features described above with respect to device 800.

Method 900 is a method for assisting in vehicle handovers and includes, in 910, monitoring an environment of a vehicle. Method 900 also includes, in 920, receiving a transition request to change control of the vehicle from an automated driving mode to a passenger of the vehicle. Method 900 also includes, in 930, detecting a key event that may be relevant to the transition request, wherein the key event is based on the monitored environment. Method 900 also includes, in 940, generating a handover scene comprising images associated with the key event, wherein the images comprise an image sequence over a time-period of the key event. Method 900 also includes, in 950, before control of the vehicle is changed from the automated driving mode to the passenger, displaying the handover scene to the passenger.

Example 1 is a vehicle handover system that includes a processor configured to monitor an environment of a vehicle. The processor is also configured to receive a transition request to change control of the vehicle from an automated driving mode to a passenger of the vehicle. The processor is also configured to detect a key event that may be relevant to the transition request, wherein the key event is based on the monitored environment. The processor is also configured to generate a handover scene that includes images associated with the key event, wherein the images include an image sequence over a time-period of the key event. The processor is also configured to, before control of the vehicle is changed from the automated driving mode to the passenger, display the handover scene to the passenger.

Example 2 is the vehicle handover system of Example 1, wherein the key event includes at least one of a movement event that has caused and/or may cause a change in a trajectory of the vehicle, an unexpected behavior event of an observed vehicle in the monitored environment of the vehicle, and/or an outside operational domain event that includes an operational setpoint for the vehicle that does not conform to an expected operating condition of the vehicle.

Example 3 is the vehicle handover system of either of Examples 1 or 2, wherein the images further include event metadata associated with the key event, wherein the event metadata includes at least one of a kind of the key event, a time of the key event, a location of the key event, a duration of the key event, an importance of each of the images associated with the key event, and/or an image viewpoint of each of the images associated with the key event.

Example 4 is the vehicle handover system of any one of Examples 1 to 3, wherein the images are generated from sensor data about the vehicle.

Example 5 is the vehicle handover system of either of Examples 3 or 4, wherein the images include an augmented image sequence generated from at least one camera image that is augmented with the event metadata.

Example 6 is the vehicle handover system of any one of Examples 1 to 5, wherein the handover scene includes a plurality of perspectives that correspond to a passenger viewpoint of the passenger.

Example 7 is the vehicle handover system of Example 6, wherein the plurality of perspectives include a front-facing camera perspective, a bird's-eye perspective, and/or a map-based perspective of the vehicle.

Example 8 is the vehicle handover system of any one of Examples 3 to 7, the handover scene includes a static image formed from the images and/or the event metadata associated with a plurality of key events.

Example 9 is the vehicle handover system of Example 8, wherein the static image includes at least one of a single frame of one of the images associated with the plurality of key events and/or a superimposed image based on superimposing one or more of the images associated with the plurality of key events.

Example 10 is the vehicle handover system of any one of Examples 1 to 9, wherein the handover scene further includes text associated with the images, wherein the text is generated from the images using a multimodal summarization system.

Example 11 is the vehicle handover system of Example 10, the text includes a description of the key event and a time at which the key event occurred.

Example 12 is the vehicle handover system of either of Examples 10 or 11, wherein the text includes a description of the key event that is verbalized to the passenger through an audio system of the vehicle.

Example 13 is the vehicle handover system of either of Example 11 or 12, wherein the time is an elapsed time since the key event occurred.

Example 14 is the vehicle handover system of any one of Examples 1 to 13, wherein the key event is assigned a priority that corresponds to an importance of the key event as compared to a current situation of the vehicle.

Example 15 is the vehicle handover system of Example 14, wherein the priority is based on at least one of an elapsed time since the key event occurred, a category of the key event, a distance from an event location of the key event to a current location of the vehicle, and/or a likelihood that the passenger is already aware of the key event.

Example 16 is the vehicle handover system of Example 15, wherein the current location of the vehicle includes an expected location of the vehicle after the elapsed time.

Example 17 is the vehicle handover system of any one of Examples 1 to 16, wherein the processor is further configured to monitor the passenger to determine the likelihood that the passenger is already aware of the key event.

Example 18 is the vehicle handover system of any one of Examples 1 to 17, wherein the processor is further configured to determine a presentation duration for presenting the handover scene to the passenger, wherein the presentation duration depends on an urgency of the transition request.

Example 19 is the vehicle handover system of Example 18, wherein the processor is further configured to compress a length of the handover scene to fit within the presentation duration.

Example 20 is the vehicle handover system of Example 19, wherein compressing the length removes a portion of image data associated with the images from the handover scene based on an importance of the portion to the key event.

Example 21 is the vehicle handover system of Example 19, wherein the handover scene includes a plurality of key events, wherein compressing the length is configured to remove at least one of the plurality of key events from the handover scene based on a priority of the at least one of the plurality of key events.

Example 22 is the vehicle handover system of any one of Examples 1 to 21, wherein the processor is further configured to store the handover scene as a stored handover scene, wherein the processor is further configured to display the stored handover scene to the passenger based on a request to review the stored handover scene.

Example 23 is the vehicle handover system of any one of Examples 1 to 22, wherein generating the handover scene depends on an expected response time of the passenger.

Example 24 is the vehicle handover system of Example 23, wherein the expected response time is based on an average response time of the passenger to a plurality of monitored events.

Example 25 is the vehicle handover system of Example 24, wherein the plurality of monitored events includes at least one of a traffic sign event, a right-of-way event, a stopping event, a turning event, a deceleration event, and/or an acceleration event.

Example 26 is the vehicle handover system of any one of Examples 23 to 25, wherein the expected response time is adjusted based on an environmental rating of the monitored environment of the vehicle.

Example 27 is the vehicle handover system of any one of Examples 1 to 26, wherein the monitored environment includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 28 is the vehicle handover system of any one of Examples 23 to 27, wherein the expected response time is adjusted based on an attention rating of the passenger that depends on an observed characteristic of the passenger.

Example 29 is the vehicle handover system of Example 28, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 30 is the vehicle handover system of Example 29, wherein the non-driving activity of the passenger includes a secondary activity in which the passenger is engaged.

Example 31 is the vehicle handover system of any one of Examples 23 to 30, wherein the expected response time is adjusted based on a geographic location of the vehicle and map-based information associated with the geographic location.

Example 32 is the vehicle handover system of Example 31, wherein the map-based information includes at least one of a road curvature, a road visibility, a density of nearby objects, and/or a road quality at the geographic location.

Example 33 is the vehicle handover system of either Examples 31 or 32, wherein the map-based information includes a baseline reaction time offset associated with an average reaction time for the geographic location.

Example 34 is the vehicle handover system of any one of Examples 26 to 33, wherein the average response time is stored in a database of average response times associated with the passenger, wherein the database of average response times is updated with the adjusted expected response time.

Example 35 is the vehicle handover system of Example 34, wherein the database of average response times further includes average response times associated with other drivers.

Example 36 is the vehicle handover system of any one of Examples 1 to 35, wherein the processor is further configured to determine a minimum response time required to implement the transition request to change control of the vehicle to the passenger.

Example 37 is the vehicle handover system of Example 36, wherein the image sequence over the time-period of the key event is based on the minimum response time.

Example 38 is the vehicle handover system of any one of Examples 23 to 37, wherein if the expected response time is slower than a minimum response time, denying the request for the transition.

Example 39 is the vehicle handover system of any one of Examples 23 to 38, wherein if the expected response time is faster than a minimum response time, proceeding with the requested transition.

Example 40 is the vehicle handover system of any one of Examples 1 to 39, wherein the observed characteristic of the passenger includes a mode confusion of the passenger, wherein the mode confusion is determined based on comparing an expected action of the passenger to an observed action of the passenger.

Example 41 is the vehicle handover system of Example 40, wherein the expected action includes an expected response to a question posed to the passenger about a simulated driving situation, and wherein the observed action includes a provided response to the question from the passenger.

Example 42 is the vehicle handover system of either Examples 40 or 41, wherein the expected action is based on a current operating state of the vehicle and a set of expected vehicle maneuvers associated with the current operating state, and wherein the mode confusion is based whether the observed action is at least one vehicle maneuver in the set of expected vehicle maneuvers.

Example 43 is the vehicle handover system of either Examples 41 or 42, wherein the processor is further configured to grant or deny the transition request based on the mode confusion.

Example 44 is a system for assessing an attention level of a passenger in a vehicle, the system includes a processor configured to determine an average response time of a passenger within the vehicle based on observations of the passenger to a plurality of monitored events. The processor is further configured to determine an environment rating for the vehicle based on a monitored environment external to the vehicle. The processor is further configured to determine an in-vehicle rating for the vehicle based on an observed characteristic of the passenger within the vehicle. The processor is further configured to determine a required response time for the geographic location of the vehicle based on received map-information about response times associated with geographic location. The processor is further configured to determine an expected response time of the passenger at the geographic location based on the average response time, the environment rating, and the in-vehicle rating. The system further includes a transmitter configured to provide the expected response time and required response time to an automated driving system of the vehicle.

Example 45 is the system of Example 44, wherein the plurality of monitored events includes at least one of a traffic sign event, a right-of-way event, a stopping event, a turning event, a deceleration event, and/or an acceleration event.

Example 46 is the vehicle handover system of either Examples 44 or 45, wherein the monitored environment external to the vehicle includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 47 is the vehicle handover system of any one of Examples 44 to 46, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 48 is the vehicle handover system of any one of Examples 44 to 47, wherein the expected response time is adjusted based on the received map-based information, wherein the received map-based information further includes at least one of a road curvature, a road visibility, a density of nearby objects, and/or a road quality at the geographic location.

Example 49 is the vehicle handover system of any one of Examples 44 to 48, wherein the map-based information further includes a baseline reaction time offset based on an average response time associated with other drivers at the geographic location.

Example 50 is the vehicle handover system of any one of Examples 44 to 49, wherein the automated driving system of the vehicle includes a vehicle handover system that determines whether to handover control of the vehicle from an automated driving mode to the passenger based on the expected response time and the required response time.

Example 51 a device for handing over control of a vehicle to a passenger that includes a processor configured to monitor an environment of the vehicle. The processor is also configured to receive a transition request to change control of the vehicle from an automated driving mode to the passenger of the vehicle. The processor is also configured to detect a key event that may be relevant to the transition request, wherein the key event is based on the monitored environment. The processor is also configured to generate a handover scene that includes images associated with the key event, wherein the images include an image sequence over a time-period of the key event. The processor is also configured to, before control of the vehicle is changed from the automated driving mode to the passenger, display the handover scene to the passenger.

Example 52 is the device of Example 51, wherein the key event includes at least one of a movement event that has caused and/or cause a change in a trajectory of the vehicle, an unexpected behavior event of an observed vehicle in the monitored environment of the vehicle, and/or an outside operational domain event that includes an operational setpoint for the vehicle that does not conform to an expected operating condition of the vehicle.

Example 53 is the device of either of Examples 51 or 52, wherein the images further include event metadata associated with the key event, wherein the event metadata includes at least one of a kind of the key event, a time of the key event, a location of the key event, a duration of the key event, an importance of each of the images associated with the key event, and/or an image viewpoint of each of the images associated with the key event.

Example 54 is the device of any one of Examples 51 to 53, wherein the images are generated from sensor data about the vehicle.

Example 55 is the device of either of Examples 53 or 54, wherein the images include an augmented image sequence generated from at least one camera image that is augmented with the event metadata.

Example 56 is the device of any one of Examples 51 to 55, wherein the handover scene includes a plurality of perspectives that correspond to a passenger viewpoint of the passenger.

Example 57 is the device of Example 56, wherein the plurality of perspectives include a front-facing camera perspective, a bird's-eye perspective, and/or a map-based perspective of the vehicle.

Example 58 is the device of any one of Examples 53 to 57, the handover scene includes a static image formed from the images and/or the event metadata associated with a plurality of key events.

Example 59 is the device of Example 58, wherein the static image includes at least one of a single frame of one of the images associated with the plurality of key events and/or a superimposed image based on superimposing one or more of the images associated with the plurality of key events.

Example 60 is the device of any one of Examples 51 to 59, wherein the handover scene further includes text associated with the images, wherein the text is generated from the images using a multimodal summarization system.

Example 61 is the device of Example 60, the text includes a description of the key event and a time at which the key event occurred.

Example 62 is the device of either of Examples 60 or 61, wherein the text includes a description of the key event that is verbalized to the passenger through an audio system of the vehicle.

Example 63 is the device of either of Example 61 or 62, wherein the time is an elapsed time since the key event occurred.

Example 64 is the device of any one of Examples 51 to 63, wherein the key event is assigned a priority that corresponds to an importance of the key event as compared to a current situation of the vehicle.

Example 65 is the device of Example 64, wherein the priority is based on at least one of an elapsed time since the key event occurred, a category of the key event, a distance from an event location of the key event to a current location of the vehicle, and/or a likelihood that the passenger is already aware of the key event.

Example 66 is the device of Example 65, wherein the current location of the vehicle includes an expected location of the vehicle after the elapsed time.

Example 67 is the device of any one of Examples 51 to 66, wherein the processor is further configured to monitor the passenger to determine the likelihood that the passenger is already aware of the key event.

Example 68 is the device of any one of Examples 51 to 67, wherein the processor is further configured to determine a presentation duration for presenting the handover scene to the passenger, wherein the presentation duration depends on an urgency of the transition request.

Example 69 is the device of Example 68, wherein the processor is further configured to compress a length of the handover scene to fit within the presentation duration.

Example 70 is the device of Example 69, wherein compressing the length removes a portion of image data associated with the images from the handover scene based on an importance of the portion to the key event.

Example 71 is the device of Example 69, wherein the handover scene includes a plurality of key events, wherein compressing the length is configured to remove at least one of the plurality of key events from the handover scene based on a priority of the at least one of the plurality of key events.

Example 72 is the device of any one of Examples 51 to 71, wherein the processor is further configured to store the handover scene as a stored handover scene, wherein the processor is further configured to display the stored handover scene to the passenger based on a request to review the stored handover scene.

Example 73 is the device of any one of Examples 51 to 72, wherein generating the handover scene depends on an expected response time of the passenger.

Example 74 is the device of Example 73, wherein the expected response time is based on an average response time of the passenger to a plurality of monitored events.

Example 75 is the device of Example 74, wherein the plurality of monitored events includes at least one of a traffic sign event, a right-of-way event, a stopping event, a turning event, a deceleration event, and/or an acceleration event.

Example 76 is the device of any one of Examples 73 to 75, wherein the expected response time is adjusted based on an environmental rating of the monitored environment of the vehicle.

Example 77 is the device of any one of Examples 51 to 76, wherein the monitored environment includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 78 is the device of any one of Examples 73 to 77, wherein the expected response time is adjusted based on an attention rating of the passenger that depends on an observed characteristic of the passenger.

Example 79 is the device of Example 78, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 80 is the device of Example 79, wherein the non-driving activity of the passenger includes a secondary activity in which the passenger is engaged.

Example 81 is the device of any one of Examples 73 to 80, wherein the expected response time is adjusted based on a geographic location of the vehicle and map-based information associated with the geographic location.

Example 82 is the device of Example 81, wherein the map-based information includes at least one of a road curvature, a road visibility, a density of nearby objects, and/or a road quality at the geographic location.

Example 83 is the device of either Examples 81 or 82, wherein the map-based information includes a baseline reaction time offset associated with an average reaction time for the geographic location.

Example 84 is the device of any one of Examples 76 to 83, wherein the average response time is stored in a database of average response times associated with the passenger, wherein the database of average response times is updated with the adjusted expected response time.

Example 85 is the device of Example 84, wherein the database of average response times further includes average response times associated with other drivers.

Example 86 is the device of any one of Examples 51 to 85, wherein the processor is further configured to determine a minimum response time required to implement the transition request to change control of the vehicle to the passenger.

Example 87 is the device of Example 86, wherein the image sequence over the time-period of the key event is based on the minimum response time.

Example 88 is the device of any one of Examples 73 to 87, wherein if the expected response time is slower than a minimum response time, denying the request for the transition.

Example 89 is the device of any one of Examples 73 to 88, wherein if the expected response time is faster than a minimum response time, proceeding with the requested transition.

Example 90 is the device of any one of Examples 51 to 89, wherein the observed characteristic of the passenger includes a mode confusion of the passenger, wherein the mode confusion is determined based on comparing an expected action of the passenger to an observed action of the passenger.

Example 91 is the device of Example 90, wherein the expected action includes an expected response to a question posed to the passenger about a simulated driving situation, and wherein the observed action includes a provided response to the question from the passenger.

Example 92 is the device of either Examples 90 or 91, wherein the expected action is based on a current operating state of the vehicle and a set of expected vehicle maneuvers associated with the current operating state, and wherein the mode confusion is based whether the observed action is at least one vehicle maneuver in the set of expected vehicle maneuvers.

Example 93 is the device of either Examples 91 or 92, wherein the processor is further configured to grant or deny the transition request based on the mode confusion.

Example 94 is a device for assessing an attention level of a passenger in a vehicle, where the device includes a processor configured to determine an average response time of a passenger within the vehicle based on observations of the passenger to a plurality of monitored events. The processor is further configured to determine an environment rating for the vehicle based on a monitored environment external to the vehicle. The processor is further configured to determine an in-vehicle rating for the vehicle based on an observed characteristic of the passenger within the vehicle. The processor is further configured to determine a required response time for the geographic location of the vehicle based on received map-information about response times associated with geographic location. The processor is further configured to determine an expected response time of the passenger at the geographic location based on the average response time, the environment rating, and the in-vehicle rating. The system further includes a transmitter configured to provide the expected response time and required response time to an automated driving system of the vehicle.

Example 95 is the device of Example 94, wherein the plurality of monitored events includes at least one of a traffic sign event, a right-of-way event, a stopping event, a turning event, a deceleration event, and/or an acceleration event.

Example 96 is the device of either Examples 94 or 95, wherein the monitored environment external to the vehicle includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 97 is the device of any one of Examples 94 to 96, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 98 is the device of any one of Examples 94 to 97, wherein the expected response time is adjusted based on the received map-based information, wherein the received map-based information further includes at least one of a road curvature, a road visibility, a density of nearby objects, and/or a road quality at the geographic location.

Example 99 is the device of any one of Examples 94 to 98, wherein the map-based information further includes a baseline reaction time offset based on an average response time associated with other drivers at the geographic location.

Example 100 is the device of any one of Examples 94 to 99, wherein the device further includes a vehicle handover system that determines whether to handover control of the vehicle from an automated driving mode to the passenger based on the expected response time and the required response time.

Example 101 is a method for handing over control of a vehicle to a passenger that includes monitoring an environment of a vehicle. The method also includes receiving a transition request to change control of the vehicle from an automated driving mode to a passenger of the vehicle. The method also includes detecting a key event that may be relevant to the transition request, wherein the key event is based on the monitored environment. The method also includes generating a handover scene that includes images associated with the key event, wherein the images include an image sequence over a time-period of the key event. The method also includes, before control of the vehicle is changed from the automated driving mode to the passenger, displaying the handover scene to the passenger.

Example 102 is the method of Example 101, wherein the key event includes at least one of a movement event that has caused and/or cause a change in a trajectory of the vehicle, an unexpected behavior event of an observed vehicle in the monitored environment of the vehicle, and/or an outside operational domain event that includes an operational setpoint for the vehicle that does not conform to an expected operating condition of the vehicle.

Example 103 is the method of either of Examples 101 or 102, wherein the images further include event metadata associated with the key event, wherein the event metadata includes at least one of a kind of the key event, a time of the key event, a location of the key event, a duration of the key event, an importance of each of the images associated with the key event, and/or an image viewpoint of each of the images associated with the key event.

Example 104 is the method of any one of Examples 101 to 103, wherein the images are generated from sensor data about the vehicle.

Example 105 is the method of either of Examples 103 or 104, wherein the images include an augmented image sequence generated from at least one camera image that is augmented with the event metadata.

Example 106 is the method of any one of Examples 101 to 105, wherein the handover scene includes a plurality of perspectives that correspond to a passenger viewpoint of the passenger.

Example 107 is the method of Example 106, wherein the plurality of perspectives include a front-facing camera perspective, a bird's-eye perspective, and/or a map-based perspective of the vehicle.

Example 108 is the method of any one of Examples 103 to 107, the handover scene includes a static image formed from the images and/or the event metadata associated with a plurality of key events.

Example 109 is the method of Example 108, wherein the static image includes at least one of a single frame of one of the images associated with the plurality of key events and/or a superimposed image based on superimposing one or more of the images associated with the plurality of key events.

Example 110 is the method of any one of Examples 101 to 109, wherein the handover scene further includes text associated with the images, wherein the text is generated from the images using a multimodal summarization system.

Example 111 is the method of Example 110, the text includes a description of the key event and a time at which the key event occurred.

Example 112 is the method of either of Examples 110 or 111, wherein the text includes a description of the key event that is verbalized to the passenger through an audio system of the vehicle.

Example 113 is the method of either of Example 111 or 112, wherein the time is an elapsed time since the key event occurred.

Example 114 is the method of any one of Examples 101 to 113, wherein the key event is assigned a priority that corresponds to an importance of the key event as compared to a current situation of the vehicle.

Example 115 is the method of Example 114, wherein the priority is based on at least one of an elapsed time since the key event occurred, a category of the key event, a distance from an event location of the key event to a current location of the vehicle, and/or a likelihood that the passenger is already aware of the key event.

Example 116 is the method of Example 115, wherein the current location of the vehicle includes an expected location of the vehicle after the elapsed time.

Example 117 is the method of any one of Examples 101 to 116, wherein the method further includes monitoring the passenger to determine the likelihood that the passenger is already aware of the key event.

Example 118 is the method of any one of Examples 101 to 117, wherein the method further includes determining a presentation duration for presenting the handover scene to the passenger, wherein the presentation duration depends on an urgency of the transition request.

Example 119 is the method of Example 118, wherein the method further includes compressing a length of the handover scene to fit within the presentation duration.

Example 120 is the method of Example 119, wherein compressing the length removes a portion of image data associated with the images from the handover scene based on an importance of the portion to the key event.

Example 121 is the method of Example 119, wherein the handover scene includes a plurality of key events, wherein compressing the length is configured to remove at least one of the plurality of key events from the handover scene based on a priority of the at least one of the plurality of key events.

Example 122 is the method of any one of Examples 101 to 121, wherein the method further includes storing the handover scene as a stored handover scene and displaying the stored handover scene to the passenger based on a request to review the stored handover scene.

Example 123 is the method of any one of Examples 101 to 122, wherein generating the handover scene depends on an expected response time of the passenger.

Example 124 is the method of Example 123, wherein the expected response time is based on an average response time of the passenger to a plurality of monitored events.

Example 125 is the method of Example 124, wherein the plurality of monitored events includes at least one of a traffic sign event, a right-of-way event, a stopping event, a turning event, a deceleration event, and/or an acceleration event.

Example 126 is the method of any one of Examples 123 to 125, wherein the expected response time is adjusted based on an environmental rating of the monitored environment of the vehicle.

Example 127 is the method of any one of Examples 101 to 126, wherein the monitored environment includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 128 is the method of any one of Examples 123 to 127, wherein the expected response time is adjusted based on an attention rating of the passenger that depends on an observed characteristic of the passenger.

Example 129 is the method of Example 128, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 130 is the method of Example 129, wherein the non-driving activity of the passenger includes a secondary activity in which the passenger is engaged.

Example 131 is the method of any one of Examples 123 to 130, wherein the expected response time is adjusted based on a geographic location of the vehicle and map-based information associated with the geographic location.

Example 132 is the method of Example 131, wherein the map-based information includes at least one of a road curvature, a road visibility, a density of nearby objects, and/or a road quality at the geographic location.

Example 133 is the method of either Examples 131 or 132, wherein the map-based information includes a baseline reaction time offset associated with an average reaction time for the geographic location.

Example 134 is the method of any one of Examples 126 to 133, wherein the average response time is stored in a database of average response times associated with the passenger, wherein the database of average response times is updated with the adjusted expected response time.

Example 135 is the method of Example 134, wherein the database of average response times further includes average response times associated with other drivers.

Example 136 is the method of any one of Examples 101 to 135, wherein the method further includes determining a minimum response time required to implement the transition request to change control of the vehicle to the passenger.

Example 137 is the method of Example 136, wherein the image sequence over the time-period of the key event is based on the minimum response time.

Example 138 is the method of any one of Examples 123 to 137, wherein if the expected response time is slower than a minimum response time, denying the request for the transition.

Example 139 is the method of any one of Examples 123 to 138, wherein if the expected response time is faster than a minimum response time, proceeding with the requested transition.

Example 140 is the method of any one of Examples 101 to 139, wherein the observed characteristic of the passenger includes a mode confusion of the passenger, wherein the mode confusion is determined based on comparing an expected action of the passenger to an observed action of the passenger.

Example 141 is the method of Example 140, wherein the expected action includes an expected response to a question posed to the passenger about a simulated driving situation, and wherein the observed action includes a provided response to the question from the passenger.

Example 142 is the method of either Examples 140 or 141, wherein the expected action is based on a current operating state of the vehicle and a set of expected vehicle maneuvers associated with the current operating state, and wherein the mode confusion is based whether the observed action is at least one vehicle maneuver in the set of expected vehicle maneuvers.

Example 143 is the method of either Examples 141 or 142, wherein the method further includes granting or denying the transition request based on the mode confusion.

Example 144 is a method for assessing an attention level of a passenger in a vehicle, the method including determining an average response time of a passenger within the vehicle based on observations of the passenger to a plurality of monitored events. The method further includes determining an environment rating for the vehicle based on a monitored environment external to the vehicle. The method further includes determining an in-vehicle rating for the vehicle based on an observed characteristic of the passenger within the vehicle. The method further includes determining a required response time for the geographic location of the vehicle based on received map-information about response times associated with geographic location. The method further includes determining an expected response time of the passenger at the geographic location based on the average response time, the environment rating, and the in-vehicle rating. The method further includes providing the expected response time and required response time to an automated driving system of the vehicle.

Example 145 is the method of Example 144, wherein the plurality of monitored events includes at least one of a traffic sign event, a right-of-way event, a stopping event, a turning event, a deceleration event, and/or an acceleration event.

Example 146 is the method of either Examples 144 or 145, wherein the monitored environment external to the vehicle includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 147 is the method of any one of Examples 144 to 146, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 148 is the method of any one of Examples 144 to 147, wherein the expected response time is adjusted based on the received map-based information, wherein the received map-based information further includes at least one of a road curvature, a road visibility, a density of nearby objects, and/or a road quality at the geographic location.

Example 149 is the method of any one of Examples 144 to 148, wherein the map-based information further includes a baseline reaction time offset based on an average response time associated with other drivers at the geographic location.

Example 150 is the method of any one of Examples 144 to 149, wherein the method further includes determining whether to handover control of the vehicle from an automated driving mode to the passenger based on the expected response time and the required response time.

Example 151 is one or more non-transient computer readable media, configured to cause one or more processors, when executed, to perform a method for handing over control of a vehicle to a passenger. The method stored in the non-transient computer readable media includes monitoring an environment of a vehicle. The method also includes receiving a transition request to change control of the vehicle from an automated driving mode to a passenger of the vehicle. The method also includes detecting a key event that may be relevant to the transition request, wherein the key event is based on the monitored environment. The method also includes generating a handover scene that includes images associated with the key event, wherein the images include an image sequence over a time-period of the key event. The method also includes, before control of the vehicle is changed from the automated driving mode to the passenger, displaying the handover scene to the passenger.

Example 152 is the non-transient computer readable media of Example 151, wherein the key event includes at least one of a movement event that has caused and/or cause a change in a trajectory of the vehicle, an unexpected behavior event of an observed vehicle in the monitored environment of the vehicle, and/or an outside operational domain event that includes an operational setpoint for the vehicle that does not conform to an expected operating condition of the vehicle.

Example 153 is the non-transient computer readable media of either of Examples 151 or 152, wherein the images further include event metadata associated with the key event, wherein the event metadata includes at least one of a kind of the key event, a time of the key event, a location of the key event, a duration of the key event, an importance of each of the images associated with the key event, and/or an image viewpoint of each of the images associated with the key event.

Example 154 is the non-transient computer readable media of any one of Examples 151 to 153, wherein the images are generated from sensor data about the vehicle.

Example 155 is the non-transient computer readable media of either of Examples 153 or 154, wherein the images include an augmented image sequence generated from at least one camera image that is augmented with the event metadata.

Example 156 is the non-transient computer readable media of any one of Examples 151 to 155, wherein the handover scene includes a plurality of perspectives that correspond to a passenger viewpoint of the passenger.

Example 157 is the non-transient computer readable media of Example 156, wherein the plurality of perspectives include a front-facing camera perspective, a bird's-eye perspective, and/or a map-based perspective of the vehicle.

Example 158 is the non-transient computer readable media of any one of Examples 153 to 157, the handover scene includes a static image formed from the images and/or the event metadata associated with a plurality of key events.

Example 159 is the non-transient computer readable media of Example 158, wherein the static image includes at least one of a single frame of one of the images associated with the plurality of key events and/or a superimposed image based on superimposing one or more of the images associated with the plurality of key events.

Example 160 is the non-transient computer readable media of any one of Examples 151 to 159, wherein the handover scene further includes text associated with the images, wherein the text is generated from the images using a multimodal summarization system.

Example 161 is the non-transient computer readable media of Example 160, the text includes a description of the key event and a time at which the key event occurred.

Example 162 is the non-transient computer readable media of either of Examples 160 or 161, wherein the text includes a description of the key event that is verbalized to the passenger through an audio system of the vehicle.

Example 163 is the non-transient computer readable media of either of Example 161 or 162, wherein the time is an elapsed time since the key event occurred.

Example 164 is the non-transient computer readable media of any one of Examples 151 to 163, wherein the key event is assigned a priority that corresponds to an importance of the key event as compared to a current situation of the vehicle.

Example 165 is the non-transient computer readable media of Example 164, wherein the priority is based on at least one of an elapsed time since the key event occurred, a category of the key event, a distance from an event location of the key event to a current location of the vehicle, and/or a likelihood that the passenger is already aware of the key event.

Example 166 is the non-transient computer readable media of Example 165, wherein the current location of the vehicle includes an expected location of the vehicle after the elapsed time.

Example 167 is the non-transient computer readable media of any one of Examples 151 to 166, wherein the method stored in the non-transient computer readable media further includes monitoring the passenger to determine the likelihood that the passenger is already aware of the key event.

Example 168 is the non-transient computer readable media of any one of Examples 151 to 167, wherein the method stored in the non-transient computer readable media further includes determining a presentation duration for presenting the handover scene to the passenger, wherein the presentation duration depends on an urgency of the transition request.

Example 169 is the non-transient computer readable media of Example 168, wherein the method stored in the non-transient computer readable media further includes compressing a length of the handover scene to fit within the presentation duration.

Example 170 is the non-transient computer readable media of Example 169, wherein compressing the length removes a portion of image data associated with the images from the handover scene based on an importance of the portion to the key event.

Example 171 is the non-transient computer readable media of Example 169, wherein the handover scene includes a plurality of key events, wherein compressing the length is configured to remove at least one of the plurality of key events from the handover scene based on a priority of the at least one of the plurality of key events.

Example 172 is the non-transient computer readable media of any one of Examples 151 to 171, wherein the method stored in the non-transient computer readable media further includes storing the handover scene as a stored handover scene and displaying the stored handover scene to the passenger based on a request to review the stored handover scene.

Example 173 is the non-transient computer readable media of any one of Examples 151 to 172, wherein generating the handover scene depends on an expected response time of the passenger.

Example 174 is the non-transient computer readable media of Example 173, wherein the expected response time is based on an average response time of the passenger to a plurality of monitored events.

Example 175 is the non-transient computer readable media of Example 174, wherein the plurality of monitored events includes at least one of a traffic sign event, a right-of-way event, a stopping event, a turning event, a deceleration event, and/or an acceleration event.

Example 176 is the non-transient computer readable media of any one of Examples 173 to 175, wherein the expected response time is adjusted based on an environmental rating of the monitored environment of the vehicle.

Example 177 is the non-transient computer readable media of any one of Examples 151 to 176, wherein the monitored environment includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 178 is the non-transient computer readable media of any one of Examples 173 to 177, wherein the expected response time is adjusted based on an attention rating of the passenger that depends on an observed characteristic of the passenger.

Example 179 is the non-transient computer readable media of Example 178, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 180 is the non-transient computer readable media of Example 179, wherein the non-driving activity of the passenger includes a secondary activity in which the passenger is engaged.

Example 181 is the non-transient computer readable media of any one of Examples 173 to 180, wherein the expected response time is adjusted based on a geographic location of the vehicle and map-based information associated with the geographic location.

Example 182 is the non-transient computer readable media of Example 181, wherein the map-based information includes at least one of a road curvature, a road visibility, a density of nearby objects, and/or a road quality at the geographic location.

Example 183 is the non-transient computer readable media of either Examples 181 or 182, wherein the map-based information includes a baseline reaction time offset associated with an average reaction time for the geographic location.

Example 184 is the non-transient computer readable media of any one of Examples 176 to 183, wherein the average response time is stored in a database of average response times associated with the passenger, wherein the database of average response times is updated with the adjusted expected response time.

Example 185 is the non-transient computer readable media of Example 184, wherein the database of average response times further includes average response times associated with other drivers.

Example 186 is the non-transient computer readable media of any one of Examples 151 to 185, wherein the method stored in the non-transient computer readable media further includes determining a minimum response time required to implement the transition request to change control of the vehicle to the passenger.

Example 187 is the non-transient computer readable media of Example 186, wherein the image sequence over the time-period of the key event is based on the minimum response time.

Example 188 is the non-transient computer readable media of any one of Examples 173 to 187, wherein if the expected response time is slower than a minimum response time, denying the request for the transition.

Example 189 is the non-transient computer readable media of any one of Examples 173 to 188, wherein if the expected response time is faster than a minimum response time, proceeding with the requested transition.

Example 190 is the non-transient computer readable media of any one of Examples 151 to 189, wherein the observed characteristic of the passenger includes a mode confusion of the passenger, wherein the mode confusion is determined based on comparing an expected action of the passenger to an observed action of the passenger.

Example 191 is the non-transient computer readable media of Example 190, wherein the expected action includes an expected response to a question posed to the passenger about a simulated driving situation, and wherein the observed action includes a provided response to the question from the passenger.

Example 192 is the non-transient computer readable media of either Examples 190 or 191, wherein the expected action is based on a current operating state of the vehicle and a set of expected vehicle maneuvers associated with the current operating state, and wherein the mode confusion is based whether the observed action is at least one vehicle maneuver in the set of expected vehicle maneuvers.

Example 193 is the non-transient computer readable media of either Examples 191 or 192, wherein the method stored in the non-transient computer readable media further includes granting or denying the transition request based on the mode confusion.

Example 194 is one or more non-transient computer readable media configured to cause one or more processors, when executed, to perform a method for handing over control of a vehicle to a passenger. The method stored in the non-transient computer readable media includes determining an average response time of a passenger within the vehicle based on observations of the passenger to a plurality of monitored events. The method further includes determining an environment rating for the vehicle based on a monitored environment external to the vehicle. The method further includes determining an in-vehicle rating for the vehicle based on an observed characteristic of the passenger within the vehicle. The method further includes determining a required response time for the geographic location of the vehicle based on received map-information about response times associated with geographic location. The method further includes determining an expected response time of the passenger at the geographic location based on the average response time, the environment rating, and the in-vehicle rating. The method further includes providing the expected response time and required response time to an automated driving system of the vehicle.

Example 195 is the one or more non-transient computer readable media of Example 194, wherein the plurality of monitored events includes at least one of a traffic sign event, a right-of-way event, a stopping event, a turning event, a deceleration event, and/or an acceleration event.

Example 196 is the one or more non-transient computer readable media of either Examples 194 or 195, wherein the monitored environment external to the vehicle includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 197 is the one or more non-transient computer readable media of any one of Examples 194 to 196, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 198 is one or more non-transient computer readable media of any one of Examples 194 to 197, wherein the expected response time is adjusted based on the received map-based information, wherein the received map-based information further includes at least one of a road curvature, a road visibility, a density of nearby objects, and/or a road quality at the geographic location.

Example 199 is one or more non-transient computer readable media of any one of Examples 194 to 198, wherein the map-based information further includes a baseline reaction time offset based on an average response time associated with other drivers at the geographic location.

Example 200 is one or more non-transient computer readable media of any one of Examples 194 to 199, wherein the method stored in the non-transient computer readable media further includes determining whether to handover control of the vehicle from an automated driving mode to the passenger based on the expected response time and the required response time.

Example 201 is a apparatus for handing over control of a vehicle to a passenger that includes a means for monitoring an environment of a vehicle. The apparatus also includes a means for receiving a transition request to change control of the vehicle from an automated driving mode to a passenger of the vehicle. The apparatus also includes a means for detecting a key event that may be relevant to the transition request, wherein the key event is based on the monitored environment. The apparatus also includes a means for generating a handover scene that includes images associated with the key event, wherein the images include an image sequence over a time-period of the key event. The apparatus also includes a means for, before control of the vehicle is changed from the automated driving mode to the passenger, displaying the handover scene to the passenger.

Example 202 is the apparatus of Example 201, wherein the key event includes at least one of a movement event that has caused and/or cause a change in a trajectory of the vehicle, an unexpected behavior event of an observed vehicle in the monitored environment of the vehicle, and/or an outside operational domain event that includes an operational setpoint for the vehicle that does not conform to an expected operating condition of the vehicle.

Example 203 is the apparatus of either of Examples 201 or 202, wherein the images further include event metadata associated with the key event, wherein the event metadata includes at least one of a kind of the key event, a time of the key event, a location of the key event, a duration of the key event, an importance of each of the images associated with the key event, and/or an image viewpoint of each of the images associated with the key event.

Example 204 is the apparatus of any one of Examples 201 to 203, wherein the images are generated from sensor data about the vehicle.

Example 205 is the apparatus of either of Examples 203 or 204, wherein the images include an augmented image sequence generated from at least one camera image that is augmented with the event metadata.

Example 206 is the apparatus of any one of Examples 201 to 205, wherein the handover scene includes a plurality of perspectives that correspond to a passenger viewpoint of the passenger.

Example 207 is the apparatus of Example 206, wherein the plurality of perspectives include a front-facing camera perspective, a bird's-eye perspective, and/or a map-based perspective of the vehicle.

Example 208 is the apparatus of any one of Examples 203 to 207, the handover scene includes a static image formed from the images and/or the event metadata associated with a plurality of key events.

Example 209 is the apparatus of Example 208, wherein the static image includes at least one of a single frame of one of the images associated with the plurality of key events and/or a superimposed image based on superimposing one or more of the images associated with the plurality of key events.

Example 210 is the apparatus of any one of Examples 201 to 209, wherein the handover scene further includes text associated with the images, wherein the text is generated from the images using a multimodal summarization system.

Example 211 is the apparatus of Example 210, the text includes a description of the key event and a time at which the key event occurred.

Example 212 is the apparatus of either of Examples 210 or 211, wherein the text includes a description of the key event that is verbalized to the passenger through an audio system of the vehicle.

Example 213 is the apparatus of either of Example 211 or 212, wherein the time is an elapsed time since the key event occurred.

Example 214 is the apparatus of any one of Examples 201 to 213, wherein the key event is assigned a priority that corresponds to an importance of the key event as compared to a current situation of the vehicle.

Example 215 is the apparatus of Example 214, wherein the priority is based on at least one of an elapsed time since the key event occurred, a category of the key event, a distance from an event location of the key event to a current location of the vehicle, and/or a likelihood that the passenger is already aware of the key event.

Example 216 is the apparatus of Example 215, wherein the current location of the vehicle includes an expected location of the vehicle after the elapsed time.

Example 217 is the apparatus of any one of Examples 201 to 216, wherein the apparatus further includes a means for monitoring the passenger to determine the likelihood that the passenger is already aware of the key event.

Example 218 is the apparatus of any one of Examples 201 to 217, wherein the apparatus further includes a means for determining a presentation duration for presenting the handover scene to the passenger, wherein the presentation duration depends on an urgency of the transition request.

Example 219 is the apparatus of Example 218, wherein the apparatus further includes a means for compressing a length of the handover scene to fit within the presentation duration.

Example 220 is the apparatus of Example 219, wherein compressing the length removes a portion of image data associated with the images from the handover scene based on an importance of the portion to the key event.

Example 221 is the apparatus of Example 219, wherein the handover scene includes a plurality of key events, wherein compressing the length is configured to remove at least one of the plurality of key events from the handover scene based on a priority of the at least one of the plurality of key events.

Example 222 is the apparatus of any one of Examples 201 to 221, wherein the apparatus further includes a means for storing the handover scene as a stored handover scene and displaying the stored handover scene to the passenger based on a request to review the stored handover scene.

Example 223 is the apparatus of any one of Examples 201 to 222, wherein generating the handover scene depends on an expected response time of the passenger.

Example 224 is the apparatus of Example 223, wherein the expected response time is based on an average response time of the passenger to a plurality of monitored events.

Example 225 is the apparatus of Example 224, wherein the plurality of monitored events includes at least one of a traffic sign event, a right-of-way event, a stopping event, a turning event, a deceleration event, and/or an acceleration event.

Example 226 is the apparatus of any one of Examples 223 to 225, wherein the expected response time is adjusted based on an environmental rating of the monitored environment of the vehicle.

Example 227 is the apparatus of any one of Examples 201 to 226, wherein the monitored environment includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 228 is the apparatus of any one of Examples 223 to 227, wherein the expected response time is adjusted based on an attention rating of the passenger that depends on an observed characteristic of the passenger.

Example 229 is the apparatus of Example 228, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 230 is the apparatus of Example 229, wherein the non-driving activity of the passenger includes a secondary activity in which the passenger is engaged.

Example 231 is the apparatus of any one of Examples 223 to 230, wherein the expected response time is adjusted based on a geographic location of the vehicle and map-based information associated with the geographic location.

Example 232 is the apparatus of Example 231, wherein the map-based information includes at least one of a road curvature, a road visibility, a density of nearby objects, and/or a road quality at the geographic location.

Example 233 is the apparatus of either Examples 231 or 232, wherein the map-based information includes a baseline reaction time offset associated with an average reaction time for the geographic location.

Example 234 is the apparatus of any one of Examples 226 to 233, wherein the average response time is stored in a database of average response times associated with the passenger, wherein the database of average response times is updated with the adjusted expected response time.

Example 235 is the apparatus of Example 234, wherein the database of average response times further includes average response times associated with other drivers.

Example 236 is the apparatus of any one of Examples 201 to 235, wherein the apparatus further includes a means for determining a minimum response time required to implement the transition request to change control of the vehicle to the passenger.

Example 237 is the apparatus of Example 236, wherein the image sequence over the time-period of the key event is based on the minimum response time.

Example 238 is the apparatus of any one of Examples 223 to 237, wherein if the expected response time is slower than a minimum response time, denying the request for the transition.

Example 239 is the apparatus of any one of Examples 223 to 238, wherein if the expected response time is faster than a minimum response time, proceeding with the requested transition.

Example 240 is the apparatus of any one of Examples 201 to 239, wherein the observed characteristic of the passenger includes a mode confusion of the passenger, wherein the mode confusion is determined based on comparing an expected action of the passenger to an observed action of the passenger.

Example 241 is the apparatus of Example 240, wherein the expected action includes an expected response to a question posed to the passenger about a simulated driving situation, and wherein the observed action includes a provided response to the question from the passenger.

Example 242 is the apparatus of either Examples 240 or 241, wherein the expected action is based on a current operating state of the vehicle and a set of expected vehicle maneuvers associated with the current operating state, and wherein the mode confusion is based whether the observed action is at least one vehicle maneuver in the set of expected vehicle maneuvers.

Example 243 is the apparatus of either Examples 241 or 242, wherein the apparatus further includes a means for granting or denying the transition request based on the mode confusion.

Example 244 is an apparatus for assessing an attention level of a passenger in a vehicle, the apparatus includes a means for determining an average response time of a passenger within the vehicle based on observations of the passenger to a plurality of monitored events. The apparatus further includes a means for determining an environment rating for the vehicle based on a monitored environment external to the vehicle. The apparatus further includes a means for determining an in-vehicle rating for the vehicle based on an observed characteristic of the passenger within the vehicle. The apparatus further includes a means for determining a required response time for the geographic location of the vehicle based on received map-information about response times associated with geographic location. The apparatus further includes a means for determining an expected response time of the passenger at the geographic location based on the average response time, the environment rating, and the in-vehicle rating. The apparatus further includes a means for providing the expected response time and required response time to an automated driving system of the vehicle.

Example 245 is the apparatus of Example 244, wherein the plurality of monitored events includes at least one of a traffic sign event, a right-of-way event, a stopping event, a turning event, a deceleration event, and/or an acceleration event.

Example 246 is the apparatus of either Examples 244 or 245, wherein the monitored environment external to the vehicle includes at least one of a weather event experienced at the vehicle, a light level incident on the vehicle, a flow of traffic near the vehicle, a traffic density of traffic near the vehicle, a speed of the vehicle, a road geometry, a road type, and/or an air temperature at the vehicle.

Example 247 is the apparatus of any one of Examples 244 to 246, wherein the observed characteristic of the passenger includes at least one of a gaze of the passenger, a head movement of the passenger, an age of the passenger, an advertising preference of the passenger, a body pose of the passenger, a body shape of the passenger, a body size of the passenger, a heart rate of the passenger, a non-driving activity of the passenger, a driving quality of the passenger, and/or a noise level inside the vehicle.

Example 248 is the apparatus of any one of Examples 244 to 247, wherein the expected response time is adjusted based on the received map-based information, wherein the received map-based information further includes at least one of a road curvature, a road visibility, a density of nearby objects, and/or a road quality at the geographic location.

Example 249 is the apparatus of any one of Examples 244 to 248, wherein the map-based information further includes a baseline reaction time offset based on an average response time associated with other drivers at the geographic location.

Example 250 is the apparatus of any one of Examples 244 to 249, wherein the apparatus further includes a means for determining whether to handover control of the vehicle from an automated driving mode to the passenger based on the expected response time and the required response While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A vehicle handover system comprising a processor configured to:
   monitor an environment of a vehicle;
   receive a transition request to change control of the vehicle from an automated driving mode to a passenger of the vehicle;
   detect a key event relevant to the transition request, wherein the key event is based on the monitored environment;
   generate a handover scene comprising images associated with the key event, wherein the images comprise an image sequence over a time-period of the key event;
   display the handover scene to the passenger before control of the vehicle is changed from the automated driving mode to the passenger;
   determine a mode confusion of the passenger based on comparing an expected action of the passenger to an observed action of the passenger; and
   grant or deny the transition request based on the mode confusion of the passenger.

2. The vehicle handover system of claim 1, wherein the key event comprises at least one of a movement event that has caused a change in a trajectory of the vehicle, an unexpected behavior event of an observed vehicle in the monitored environment of the vehicle, and/or an outside operational domain event that includes an operational setpoint for the vehicle that does not conform to an expected operating condition of the vehicle.

3. The vehicle handover system of claim 1, wherein the images comprise an augmented image sequence generated from at least one camera image that is augmented with event metadata associated with the key event.

4. The vehicle handover system of claim 1, wherein the handover scene comprises a plurality of perspectives that correspond to a viewpoint of the passenger.

5. The vehicle handover system of claim 1, wherein the handover scene comprises a static image formed from the images and event metadata associated with a plurality of key events.

6. The vehicle handover system of claim 1, wherein the handover scene further comprises text associated with the images, wherein the text is generated from the images using a multimodal summarization system.

7. The vehicle handover system of claim 6, wherein the text comprises a description of the key event that is verbalized to the passenger through an audio system of the vehicle.

8. The vehicle handover system of claim 1, wherein the key event is assigned a priority that corresponds to an importance of the key event as compared to a current situation of the vehicle, wherein the priority is based on at least one of an elapsed time since the key event occurred, a category of the key event, a distance from an event location of the key event to a current location of the vehicle, and/or a likelihood that the passenger is already aware of the key event.

9. The vehicle handover system of claim 1, wherein the processor is further configured to monitor the passenger to determine the likelihood that the passenger is already aware of the key event.

10. The vehicle handover system of claim 1, wherein generating the handover scene depends on an expected response time of the passenger, wherein the expected response time is based on an average response time of the passenger to a plurality of monitored events.

11. The vehicle handover system of claim 10, wherein the expected response time is adjusted based on an environmental rating of the monitored environment of the vehicle.

12. The vehicle handover system of claim 10, wherein the expected response time is adjusted based on an attention rating of the passenger that depends on an observed characteristic of the passenger.

13. The vehicle handover system of claim 10, wherein the expected response time is adjusted based on a geographic location of the vehicle and map-based information associated with the geographic location.

14. The vehicle handover system of claim 13, wherein the map-based information comprises a baseline reaction time offset associated with an average reaction time for the geographic location.

15. The vehicle handover system of claim 1, wherein the processor is further configured to determine a minimum response time required to implement the transition request to change control of the vehicle to the passenger and, if the expected response time is slower than a minimum response time, to deny the request for the transition.

16. The vehicle handover system of claim 1, wherein the expected action is based on a current operating state of the vehicle and a set of expected vehicle maneuvers associated with the current operating state, and wherein the mode confusion is based whether the observed action is at least one vehicle maneuver in the set of expected vehicle maneuvers.

17. A non-transitory computer readable medium, comprising instructions which, if executed, cause one or more processors to:

monitor an environment of a vehicle;

receive a transition request to change control of the vehicle from an automated driving mode to a passenger of the vehicle;

detect a key event relevant to the transition request, wherein the key event is based on the monitored environment;

generate a handover scene that includes images associated with the key event, wherein the images include an image sequence over a time-period of the key event; and display the handover scene to the passenger before control of the vehicle is changed from the automated driving mode to the passenger;

determine a mode confusion of the passenger based on comparing an expected action of the passenger to an observed action of the passenger; and grant or deny the transition request based on the mode confusion of the passenger.

18. The non-transitory computer readable medium of claim 17, wherein the instructions further cause the one or more processors to determine a presentation duration for presenting the handover scene to the passenger, wherein the presentation duration depends on an urgency of the transition request.

19. The non-transitory computer readable medium of claim 18, wherein the instructions further cause the one or more processors to compress a length of the handover scene to fit within the presentation duration by removing a portion of image data associated with the images from the handover scene based on an importance of the portion to the key event.

* * * * *